(12) United States Patent
Urushihara et al.

(10) Patent No.: US 7,831,132 B2
(45) Date of Patent: Nov. 9, 2010

(54) INFORMATION PROCESSING DEVICE AND PROGRAM

(75) Inventors: Makoto Urushihara, Tokyo (JP); Keisuke Hiroi, Tokyo (JP); Hideyuki Agata, Tokyo (JP); Takashi Ohkubo, Kanagawa (JP); Yoshiyuki Takao, Tokyo (JP)

(73) Assignee: Sony Corporation, Tokyo (JP)

( * ) Notice: Subject to any disclaimer, the term of this patent is extended or adjusted under 35 U.S.C. 154(b) by 1167 days.

(21) Appl. No.: 10/522,752

(22) PCT Filed: Sep. 2, 2003

(86) PCT No.: PCT/JP03/11191

§ 371 (c)(1),
(2), (4) Date: Feb. 1, 2005

(87) PCT Pub. No.: WO2004/023803

PCT Pub. Date: Mar. 18, 2004

(65) Prior Publication Data

US 2005/0286361 A1    Dec. 29, 2005

(30) Foreign Application Priority Data

Sep. 6, 2002  (JP) ............................. 2002-260941
Sep. 6, 2002  (JP) ............................. 2002-260942

(51) Int. Cl.
*H04N 5/91* (2006.01)
(52) U.S. Cl. .................................................. 386/131
(58) Field of Classification Search .................. 348/441; 386/46, 131
See application file for complete search history.

(56) References Cited

U.S. PATENT DOCUMENTS

| | | | | |
|---|---|---|---|---|
| 5,793,927 A | * | 8/1998 | Lane ............................. | 386/81 |
| 5,835,668 A | * | 11/1998 | Yanagihara .................. | 386/95 |
| 6,320,825 B1 | | 11/2001 | Bruckers et al. | |
| 6,385,386 B1 | | 5/2002 | Aotake | |
| 6,549,307 B1 | | 4/2003 | Makishima et al. | |
| 7,386,218 B2 | * | 6/2008 | Temple et al. ................. | 386/46 |

(Continued)

FOREIGN PATENT DOCUMENTS

DE            100 10 490 A1       9/2000

(Continued)

*Primary Examiner*—Marsha D Banks Harold
*Assistant Examiner*—Asher Khan
(74) *Attorney, Agent, or Firm*—Oblon, Spivak, McClelland, Maier & Neustadt, L.L.P.

(57) ABSTRACT

An information processing apparatus is configured to execute a sequence of processing operations for recording video data recorded to a first recording medium in a first format to a second recording medium in a second format, without user's manual intervention. Any one of three settings is provided in accordance with total time Tx of data to be written to a DVD: a first setting in which a maximum value of image bit rate (first value B1) and a maximum value of audio bit rate (second value B2) are used; a second setting in which a first value of image bit rate and a third value B3 of audio bit rate are used; and a third setting in which a fourth value of image bit rate determined on the basis of a line and the third value B3 of audio bit rate are used. The information processing apparatus may be an apparatus for recording the data recorded to a digital cassette video tape to a DVD.

23 Claims, 25 Drawing Sheets

U.S. PATENT DOCUMENTS

| | | | |
|---|---|---|---|
| 2002/0054754 A1* | 5/2002 | Kikuchi et al. | 386/83 |
| 2002/0083238 A1 | 6/2002 | Naka et al. | |
| 2003/0194008 A1* | 10/2003 | Acharya et al. | 375/240.12 |
| 2006/0010136 A1* | 1/2006 | Deangelo | 707/10 |

FOREIGN PATENT DOCUMENTS

| | | |
|---|---|---|
| JP | 3-161826 | 7/1991 |
| JP | 8-17137 | 1/1996 |
| JP | 8-31044 | 2/1996 |
| JP | 8-331556 | 12/1996 |
| JP | 9-154099 | 6/1997 |
| JP | 9-284715 | 10/1997 |
| JP | 10-214456 | 8/1998 |
| JP | 11-298850 | 10/1999 |
| JP | 2000-59731 | 2/2000 |
| JP | 2000-333169 | 11/2000 |
| JP | 2001-67799 | 3/2001 |
| JP | 2001-128126 | 5/2001 |
| JP | 2002-25192 | 1/2002 |
| JP | 2002-171485 | 6/2002 |
| JP | 2002-196797 | 7/2002 |
| JP | 2002-352506 | 12/2002 |
| WO | WO 00/49617 | 8/2000 |
| WO | WO 02/28101 | 4/2002 |

* cited by examiner

INFORMATION PROCESSING DEVICE AND PROGRAM

TECHNICAL FIELD

The present invention relates generally to an information processing apparatus and a program and, more particularly, to an information processing apparatus and a program that are adapted to execute a sequence of processing for recording video data recorded to a first recording medium in a first format to a second recording medium in a second format without requiring the manual operation of a user.

BACKGROUND ART

The recent widespread use of personal computers (hereafter appropriately referred to as PCs) and digital video tape recorders (hereafter appropriately referred to as DVs) allows users to capture the video data taken through their DVs into their PCs to record the video data to DVDs (Digital Versatile Discs).

Conventionally, however, capturing the video data taken through a DV into a PC and authoring the captured video data (for example, recording the captured video data to a DVD) are separate processes, so that recording the video data taken with the DV requires the user to perform complicated jobs and with a lot of time.

To be more specific, when recording the video data taken with the DV to a DVD, the user must manually start up an application software program for capturing the video data of DV format from the DV into the PC (this program hereafter referred to as a data acquisition program) on the PC and perform operations (manual operations) specified by the data acquisition program, thereby capturing the video data from the DV into the PC, the captured video data being stored in the hard disk drive for example in the PC in the DV format.

Next, the user manually starts up the data acquisition program and then manually starts up an application software program for recording the video data stored in the hard disk drive to a DVD (this application software program hereafter referred to as a DVD writing program) on the PC, performs operations (manual operations) specified in the DVD writing program to convert the format of the video data stored in the hard disk drive into DVD format, records the video data of DVD format to a DVD, and, when this recording ends, manually exits the DVD writing program.

As described, when recording the video data taken with the DV to a DVD by use of the PC, the user must perform a complicated job involving a plurality of manual operations which require a lot of time.

Incidentally, the followings are disclosed as conventional data acquisition programs: "DVgate" products description, "online", Sony Drive Home Page, "searched on Aug. 30, 2002", Internet <URL: http://www.sony.jp/products/Comsumer/PCOM/Software_02q2/D Vgate/index.html>.

Additionally, the followings are disclosed as conventional DVD writing programs: "Simple DVD Maker" products description, "online", Sony Drive Home Page, description of "Simple DVD Maker", "searched on Aug. 30, 2002", Internet, <URL:http://www.sony.jp/products/Consumer/PCOM/Fun/DVD-RW/>

DISCLOSURE OF INVENTION

It is therefore an object of the present invention to allow the execution of a sequence of processing operations for recording the video data recorded to a first recording medium in a first format to a second recording medium in a second format without requiring user's manual operations.

In carrying out the invention and according to one aspect thereof, there is provided an information processing apparatus including: checking means for checking predetermined time information of content data recorded in a first format; setting means for setting, on the basis of the content data time information checked by the checking means, bits rates with which the content data is recorded from the information processing device to a predetermined removable recording medium; and recording control means for converting the format of the content data from the first format to a second format and recording the converted content data to the recording medium with the bit rates set by the setting means.

In the above-mentioned information processing apparatus, the checking means checks a recording time of the content data recorded in the first format as the time information.

In the above-mentioned information processing apparatus, the content data is constituted by a moving image data and audio data corresponding thereto; the setting means sets, as the bit rates, a first bit rate corresponding to the moving image data and a second bit rate corresponding to the audio data; and the recording control means executes control so as to record the moving image data of the content data in the first bit rate set by the setting means and record the audio data in the second bit rate set by the setting means.

In the above-mentioned information processing apparatus, a first fixed value is predetermined as a maximum value among settable values of the first bit rate; a second fixed value is predetermined as a maximum value among settable values of the second bit rate; and the setting means, if a first inequality expressed in $(B1+B2) \times Tx < Cmax$ where $Tx$ denotes a recording time of the content data checked by the checking means, $B1$ denotes the first fixed value, $B2$ denotes the second fixed value, and $Cmax$ denotes a recordable maximum capacity of the recording medium of which recording is controlled by the recording control means, is found established, then sets the first fixed value as a value of the first bit rate and the second fixed value as a value of the second bit rate.

In the above-mentioned information processing apparatus, a third fixed value lower than the second fixed value is predetermined as a settable value of the second bit rate; and the setting means, if the first inequality is found not established and a second inequality expressed in $(B1+B3) \times Tx < Cmax$ where $B3$ denotes the third fixed value is found established, then sets the first fixed value as a value of the first bit rate and the third fixed value as a value of the second bit rate.

In the above-mentioned information processing apparatus, the setting means, if the first inequality is found not established and the second inequality is found not established, then computes a fourth value denoted by $B4$ in a third inequality for establishing the third inequality $(B4+B3) \times Tx < Cmax$, sets the computed fourth value as a value of the first bit rate and the third fixed value as a value of the second bit rate.

In the above-mentioned information processing apparatus, the setting means computes the fourth value on the basis of the establishment of the third inequality and a predetermined characteristic that, as a recording time of the content data checked by the checking means increases, the value of the first bit rate linearly decreases.

In the above-mentioned information processing apparatus, the first format is a format of a digital video tape recorder and the second format is a format specified by the DVD standard.

The above-mentioned information processing apparatus, further including: storage means for storing the content data, the recording control means having: computation means for computing a free capacity of the storage means; acquisition means for dividing the content data into a plurality of data sections on the basis of the free capacity of the storage means computed by the computation means, acquiring a predetermined first data section among the plurality of data sections, and storing the acquired predetermined first data section into the storage means; conversion means for converting the format of the first data section acquired by the acquisition means from the first format to a second format, generating a second data section smaller in data amount than the first data section, and storing the generated second data section into the storage means; deletion means for deleting, when the generated second data section obtained by converting the format of the first data section by the conversion means has been stored in the storage means, the first data section from the storage means before a third data section different from the first data section is acquired by the acquisition means from among the plurality of data sections forming the content data; and recording medium recording control means for, if the content data has all been acquired in the acquisition means, converted into the second format in the conversion means, and stored in the storage device, recording the content data of the second format to the recording medium at the bit rate set by the setting means.

In the above-mentioned information processing apparatus, the computation means computes a first data amount of the content data in the first format and a second data amount of the content data in the second format and adds the computed first data amount and the computed second data amount together to compute a first threshold value; and the acquisition means, if the free capacity of the storage means computed by the computation means is smaller than the first threshold value computed by the computation means, sets, as a second threshold value, an amount obtained by subtracting the second data amount computed by the computation means from the free capacity of the storage means, divides the content data into the plurality of data sections having a data amount smaller than the second threshold value, and acquires the first data section among the plurality of data sections, and stores the acquired first data section into the storage means.

In the above-mentioned information processing apparatus, the first format is a format of a digital video tape recorder; the acquisition means acquires the content data by making the digital video tape recorder reproduce a digital video tape on which the content data is recorded; and the second format is a format specified by the DVD standard.

In the above-mentioned information processing apparatus, the recording control means further has section checking means makes the digital video tape recorder reproduce the digital video tape recorded with the content data to check a recording section that appears after the recording start point and before the recording end point; and the acquisition means divides the content data by use of data corresponding to each of the plurality of recording sections checked by the section checking means, as one of the section data, and acquires the first section data of the plurality of divided section data, thereby storing the acquired first section data into the storage means.

In the above-mentioned information processing apparatus, the acquisition means, if there is any data among data corresponding to the plurality of recording sections checked by the section checking means that exceeds the second threshold value in data amount, does not handle the data corresponding to the recording section exceeding the second threshold value in data amount as one of the section data, but further divides the data into a plurality of data lower in data amount than the second threshold value, divides the content data with each of the plurality of data lower in data amount than the second threshold value used as one section data, acquires the first section data among the plurality of section data, and stores the first section data into the storage means.

In the above-mentioned information processing apparatus, the section checking means makes the digital video tape recorder reproduce the digital video tape recorded with the content data at a speed higher than normal to check an interim recording section corresponding to the recording section; and the acquisition means divides the content data with data corresponding to the plurality of interim recording sections checked by the section checking means used as one interim section data, detects a recording start point of the recording section corresponding to a predetermined first section data among the plurality of interim section data, controls the digital video tape recorder to reproduce data corresponding to the recording section from the detected recording start point up to the recording end point that appears next to the recording start point, acquires, as the first section data, the data corresponding to the recording section of which reproduction by the digital video tape recorder is controlled, and stores the data thus acquired into the storage means.

In carrying out the invention and according to another aspect thereof, there is provided a program for making a computer execute the steps of: checking step for checking predetermined time information of content data recorded in a first format; setting step for setting, on the basis of the content data time information checked by the checking step, bits rates with which the content data is recorded from the information processing device to a predetermined removable recording medium; and recording control step for converting the format of the content data from the first format to a second format and recording the converted content data to the recording medium with the bit rates set by the setting step.

In the above-mentioned program, the recording control step including: computation step for computing a free capacity of a predetermined storage device; acquisition step for dividing the content data into a plurality of data sections on the basis of the free capacity of the storage device computed by the computation step, acquiring a predetermined first data section among the plurality of data sections, and storing the acquired predetermined first data section into the storage device; conversion step for converting the format of the first data section acquired by the acquisition step from the first format to a second format, generating a second data section smaller in data amount than the first data section, and storing the generated second data section into the storage device; deletion step for deleting, when the generated second data section obtained by converting the format of the first data section by the conversion step has been stored in the storage device, the first data section from the storage device before a third data section different from the first data section is acquired by the acquisition step from among the plurality of data sections forming the content data; and recording medium recording control step for, if the content data has all been acquired in the acquisition step, converted into the second format in the conversion step, and stored in the storage device, recording the content data of the second format to the recording medium at the bit rate set by the setting step.

In the information processing apparatus and the program according to the invention, predetermined time information of content data recorded in a first format is checked and, on the basis of the checked time information of the content data, a bit rate at which the content data is recorded from a computer to a predetermined removable recording medium is set. Next, the format of the content data is converted from the first format to a second format and the content data converted in format is recorded to the recording medium at that bit rate.

The information processing apparatus according to the invention may be connected to the reproduction device in a wired or wireless manner.

The information processing apparatus according to the invention may control the recording to a recording medium loaded on a drive incorporated in the information processing apparatus itself or the recording to a recording medium loaded on an external drive device connected to the information processing apparatus in a wired or wireless manner by controlling the external drive device.

It should be noted that the present invention is obviously applicable as an information processing method corresponding to the information processing apparatus according to the invention as well as a recording medium for recording the program according to the invention.

BEST MODE FOR CARRYING OUT THE INVENTION

Figure 1:
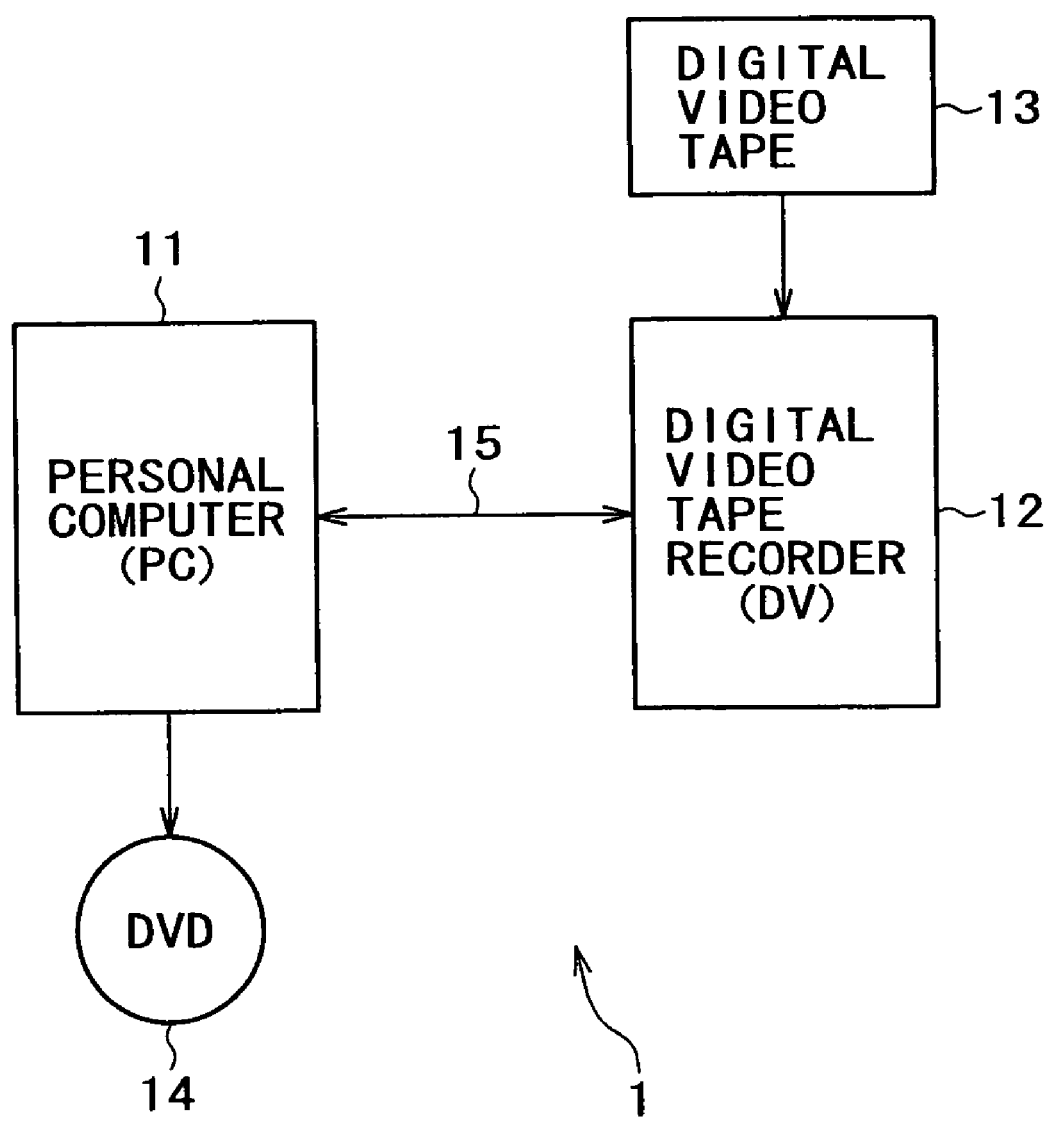
FIG. 1 is a block diagram illustrating an exemplary configuration of an information processing system including a personal computer to which the present invention is applied.

Now, referring to FIG. 1, there is shown an exemplary configuration of an information processing system practiced as one embodiment of the invention.

In FIG. 1, an information processing system 1 has a personal computer 11 (hereafter referred to a PC 11) and a digital video tape recorder 12 (hereafter referred to as a DV 12) that are interconnected with a connection line 15.

The connection line 15 may be either wired or wireless and is not limited to a particular embodiment; in the present example, dedicated cable i.LINK (trademark) is used. Namely, in this example, the PC 11 and the DV 12 are interconnected with i.LINK. i.LINK, a trademark of Sony Corporation, the applicant hereof, provides IEEE (Institute of Electrical and Electronics Engineers) 1394 high-speed digital interface. Therefore, the PC 11 and the DV 12 mutually transmits and receives the data (stored in packets) compliant with the IEEE1394 standard.

When a digital video tape 13 recorded with predetermined video data taken by the DV 12 or another DV is loaded on the DV 12, the DV 12 reproduces the video data from the digital video tape 13 and transmits the reproduced data to the PC 11 via the connection line 15 as a reproduced video signal under the control of the PC 11 (or by the user's manual operation).

The PC 11 receives the reproduction video signal from the DV 12 via the connection line 15, converts the format of the video data corresponding the received reproduced video signal, from the DV format to the DVD (Digital Versatile Disc) format (for example, MPEG-2 (Moving Picture Experts Group-2) format), and writes (or records) the video data in the converted format to a DVD 14 loaded on the PC 11. It should be noted that DVD-R, DVD-RW, DVD+R, DVD+RW, and DVD-RAM are generically referred to as the DVD 14.

Figure 2:
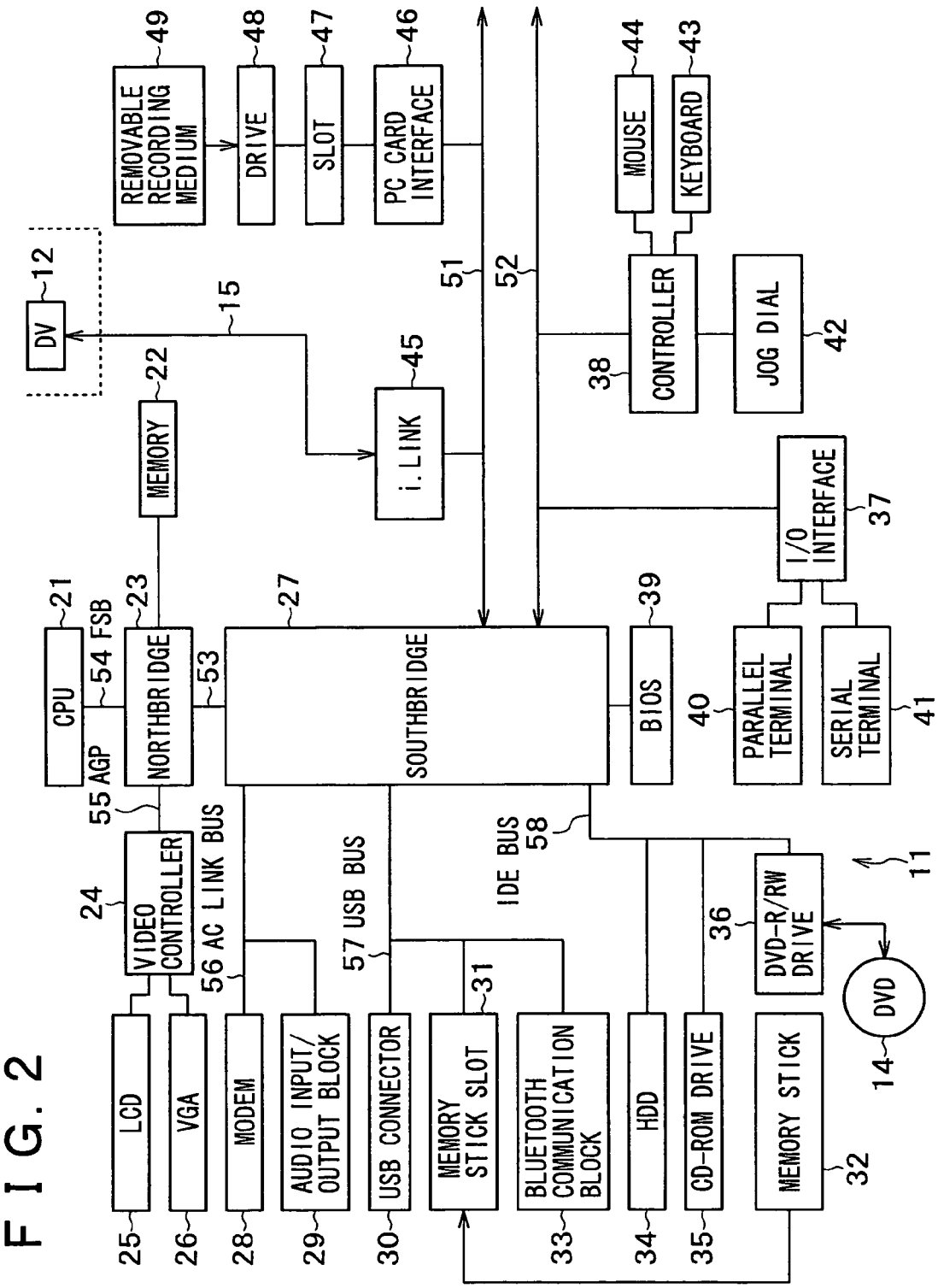
FIG. 2 is a block diagram illustrating an exemplary hardware configuration of the personal computer to which the present invention is applied in the information processing system shown in FIG. 1.

Referring to FIG. 2, there is shown a detail exemplary configuration of the PC 11.

In the PC 11 shown in FIG. 2, a CPU 21 is based on Pentium (trademark) Processor of Intel Corporation for example and connected to a front side bus (FSB) 54. The FSB 54 is connected to the Northbridge 23. The Northbridge 23 has an AGP (Accelerated Graphics Port) 55 and is connected to a hub interface 53.

The Northbridge 23 is based on 440BX, AGP Host Bridge Controller of Intel Corporation, for example, controlling the CPU 21 and a memory 22. The memory 22 is configured as RAM (Random Access Memory) and a cache memory (both not shown).

The RAM is based on DRAM (Dynamic RAM) for example and stores programs that are executed by the CPU 21 or data that is required for the CPU 21 to operate. To be more specific, the RAM stores an OS (Operating System) loaded from a HDD 34 and an Internet program when a boot sequence has been completed. The OS is a program that controls computer's basic operations, represented by Windows XP (trademark) of Microsoft Corporation or Mac OS (trademark) of Apple Computer, Inc., for example.

The cache memory is based on SRAM (Static RAM) that has higher access speed than RAM, and caches (or temporarily stores) programs or data to be used by the CPU 21.

It should be noted that the CPU 21 incorporates a primary cache that operates faster than the cache memory and is controlled by the CPU 21 itself.

The Northbridge 23 also controls a video controller 24 via an AGP 55. The video controller 24 controls an LCD (Liquid Crystal Display) 25 or a display (hereafter referred to a VGA 26) based on VGA (Video Graphics Array).

The video controller 24 receives data (image data or text data) supplied from the CPU 21 and generates the image data corresponding to the received data or directly stores the received data into an incorporated video memory (not shown). The video controller 24 transmits an image corresponding to the image data stored in the video memory to the LCD 25 or the VGA 26. The LCD 25 or the VGA 26 display an image or a text on the basis of the data supplied from the video controller 24.

The Northbridge 23 is also connected to a Southbridge 27 via the hub interface 53. The Southbridge 27, based on PIIX4E of Intel Corporation for example, executes various I/O (Input/Output) control operations, such as control over devices connected to an AC link bus 56, a USB bus 57, and an IDE bus 58.

To be more specific, the AC link bus 56 is connected with a modem 28 and an audio input/output block 29. The 28 is connected to a public switched line, thereby executing communication processing through the public switched line or the Internet (both not shown). The audio input/output block 29 captures voice from a microphone (not shown), generates data corresponding to the captured voice, and outputs the generated data to the memory 22. The audio input/output block 29 also drives a speaker (not shown) to sound voice.

The USB bus 57 of the Southbridge 27 is connected with a USB connector 30 to provide USB device connections. Through the USB bus 57, a Memory Stick slot 31 and a Bluetooth communication block 33 are connected to the Southbridge 27. A Memory Stick (trademark) 32 is loaded in the Memory Stick slot 31.

The Memory Stick 32 is a kind of flash memory card developed by Sony Corporation, the applicant hereof. The Memory Stick 32 is configured by accommodating a flash memory element, a kind of EEPROM (Electrically Erasable and Programmable Read Only Memory), a non-volatile memory, into a small, thin plastic case having dimensions of 21.5 mm (long)×50 mm (wide)×2.8 mm (thick). The Memory Stick 32 has a 10-pin terminal through which various kinds of data such as image, voice, and music for example are written to or read from it. The Bluetooth communication block 33 executes communication based on the Bluetooth standard.

The IDE bus 58 of the Southbridge 27 is connected with a HDD 34. The IDE bus 58 is also electrically connected with so-called IDE devices, such as a CD-ROM (Compact Disc-Read Only Memory) drive 35 and a DVD-R/RW drive 36. The above mentioned DVD 14 is loaded on the DVD-R/RW drive 36.

The Southbridge 27 is also connected with a BIOS (Basic Input Output System) 39, a PCI (Peripheral Component Interconnect) bus 51, and an LPC (Low Pin Count) bus 52.

The BIOS 39 is a group of programs based on the basic operation commands of the PC 11 and stored in a ROM (Read Only Memory) (not shown) for example. The BIOS 39 is executes control over the transfer (or input/output) of data between the OS or an application program and peripheral devices.

The LPC bus 52 is connected with an I/O (Input/Output) interface 37 and a controller 38.

The I/O interface 37 is connected with a parallel terminal 40 and a serial terminal 41, transferring data with devices connected to these terminals.

The controller 38 is connected with input devices (or input means) such as a jog dial 42, a keyboard 43, and a mouse 44, controlling these input devices and the power supplied from a power unit (not shown).

The PCI bus 51 is connected with an i.LINK 45 and a PC card interface 46. As described above, the i.LINK 45 supplies signals (for example, control signals for directing the reproduction of the DV 12 which will be described later) supplied from the CPU 21 to the DV 12 via the dedicated cable 15 and signals (for example, a reproduced video signal which will be described later) supplied from the DV 12 via the cable 15 to the CPU 21, the memory 22, or the HDD 34. The PC card interface 46 supplies the data supplied from a device (or a card (not shown)) loaded in a slot 47 to the CPU 21 or the memory 22 and outputs the data supplied from the CPU 21 to the card loaded in the slot 47.

The slot 47 is connected with a drive 48 as required as shown in FIG. 2. In this case, the drive 48 is connected to the PCI bus 51 via the slot 47 and the PC card interface 46. The drive 48 reads data from a removable recording medium 49 such as loaded magnetic disc, optical disc, magneto-optical disc, or semiconductor memory and supplies the read data to the memory 22. Also the drive 48 stores the data generated by the processing by the CPU 21 to the removable recording medium 49 loaded on the drive 48.

Figure 3:
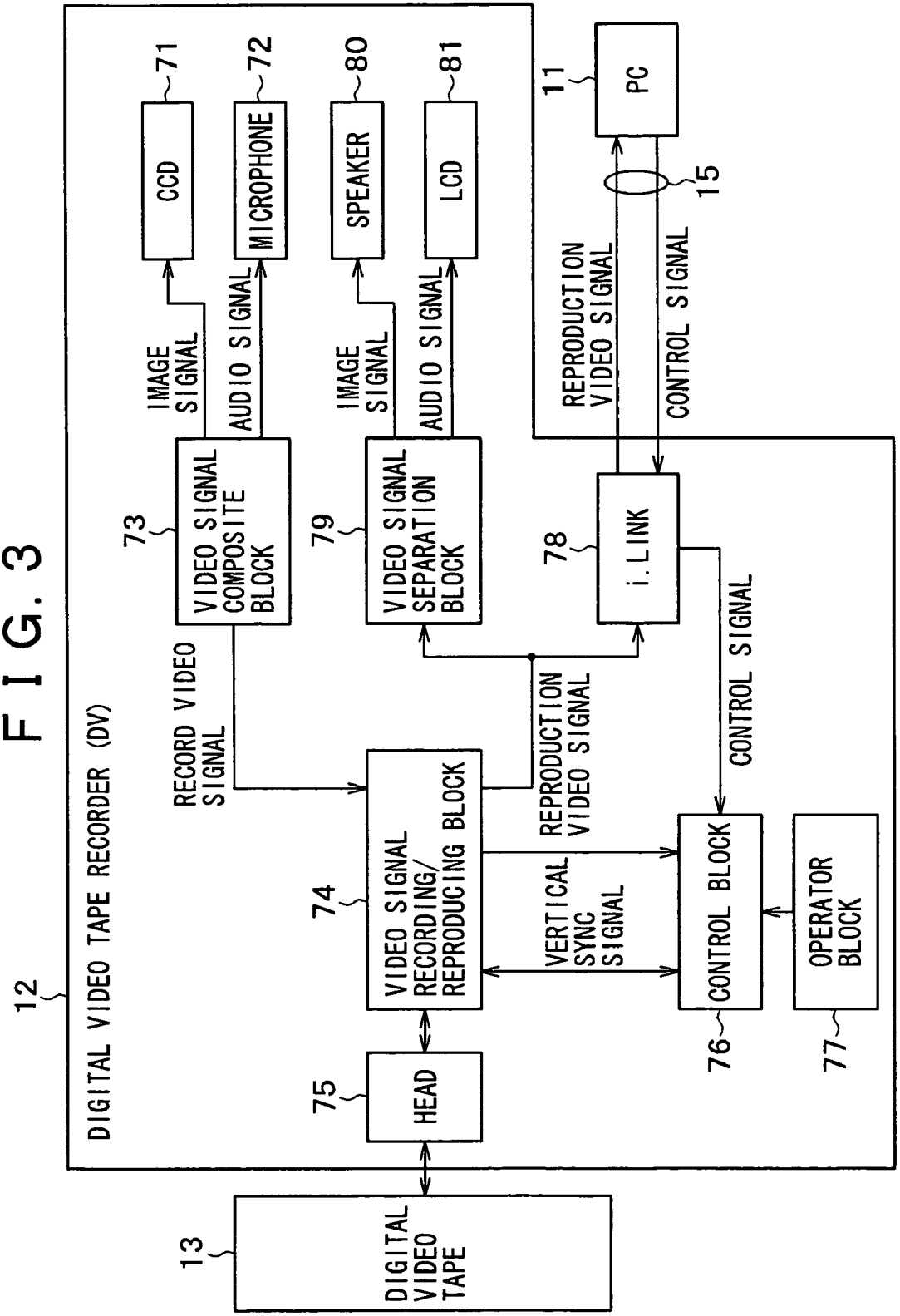
FIG. 3 is a block diagram illustrating an exemplary configuration of a digital video recorder in the information processing system shown in FIG. 1.

Referring to FIG. 3, there is shown a detail exemplary configuration of the DV 12 of the information processing system 1 shown in FIG. 1.

As shown in FIG. 3, the DV 12 has: a CCD (Charge Coupled Device) 71 that takes an object as a moving image and outputs it as an image signal; a microphone 72 for capturing voice around the DV 12 while the CD 71 takes the object, and outputting it as an audio signal; a video signal composite block 73 for combining an image signal supplied from the CCD 71 with an audio signal supplied from the microphone 72 to output a record video signal; a video signal recording/reproducing block 74 that A/D (Analog to Digital) converts a record video signal supplied from the video signal composite block 73, encodes the converted signal, modulates the encoded signal, and supplies the modulated signal to a head 75, thereby recording the signal to the above-mentioned digital video tape 13 and outputting the reproduced video signal obtained from the digital video tape 13 via the head 75; and the head 75.

The DV 12 also has a control block 76 that receives a vertical sync signal from the video signal recording/reproducing block 74, outputs a control signal corresponding to this vertical sync signal to the video signal recording/reproducing block 74 in synchronization with the vertical sync signal, and controls the entire operation of the DV 12 on the basis of operation command signals supplied from an operator block 77 and control signals supplied from the PC 11 via the cable 15 and an i.LINK 78 and the operator block 77 based on buttons, switches, or a remote controller that outputs operation command signals corresponding to input operations made by the user.

Further, the DV 12 has the i.LINK 78, a video signal separation block 79, a speaker 80, and an LCD (Liquid Crystal Display) 81.

The i.LINK 78, connected with the above-mentioned i.LINK 45 (FIG. 2) of the PC 11 via the connection cable 15, transmits a reproduced video signal (a digital signal) supplied from the video signal recording/reproducing block 74 to the PC 11 via the cable 15 and receives a control signal supplied from the PC 11 to transmit it to the control block 76.

The control signals transmitted by the PC 11 are not limited to particular ones; therefore control signals for executing various control operations can be used. In this example, at least the following control signals are used, for example. The control signals are: for reproducing the digital video tape 13 loaded on the DV 12 at normal speed and at k-times speed to the normal speed (k can be any number other than 1, if k is a positive number, it indicates the reproduction in the forward direction and, if k is a negative number, it indicates the reproduction in the reverse direction); for fast forward reproduction; for rewind; and for stop of tape operation (reproduction (including k-times reproduction), fast forward, or rewind).

Therefore, In this example, when a control signal indicative of reproduction (including k-times reproduction), fast forward, or rewind is transmitted from the PC 11 via the cable 15, the control block 76 receives it through the i.LINK 78 and executes the processing corresponding to the received control signal, namely, reproduction (including k-times reproduction), fast forward, or rewind. Next, when a stop control signal is transmitted from the PC 11 via the cable 15, the control block 76 receives it through the i.LINK 78 and stops the processing being executed on the video tape recorder 13 loaded on the DV 12. Thus, the DV 12 can be remotely controlled by the PC 11 through the i.LINK 78.

The video signal separation block 79 demodulates a digital reproduced video signal supplied from the video signal recording/reproducing block 74, decodes the demodulated signal, D/A (Digital to Analog) converts the decoded signal, separates the converted signal into an audio signal and an image signal, and supplies the audio signal to the speaker 80 and the image signal to the LCD 81. The speaker 80 sounds the audio signal supplied from the video signal separation block 79. The LCD 81 displays the image signal supplied from the video signal separation block 79 as a moving image.

The following describes, with reference to drawings, a software program for realizing a function of the functions provided by the PC 11 shown in FIG. 2 to the function of which the present invention is applied; namely, the function of continuously (or in a batch) executing the processing of acquiring the video data (hereafter simply referred to as recorded data) from the digital video tape 13 loaded on the DV 12 and writing (or recording) this data to the DVD 14 loaded on the DVD-R/RW drive 36 (in what follows, this software program is referred to as a data acquisition/DVD write block).

Figure 4:
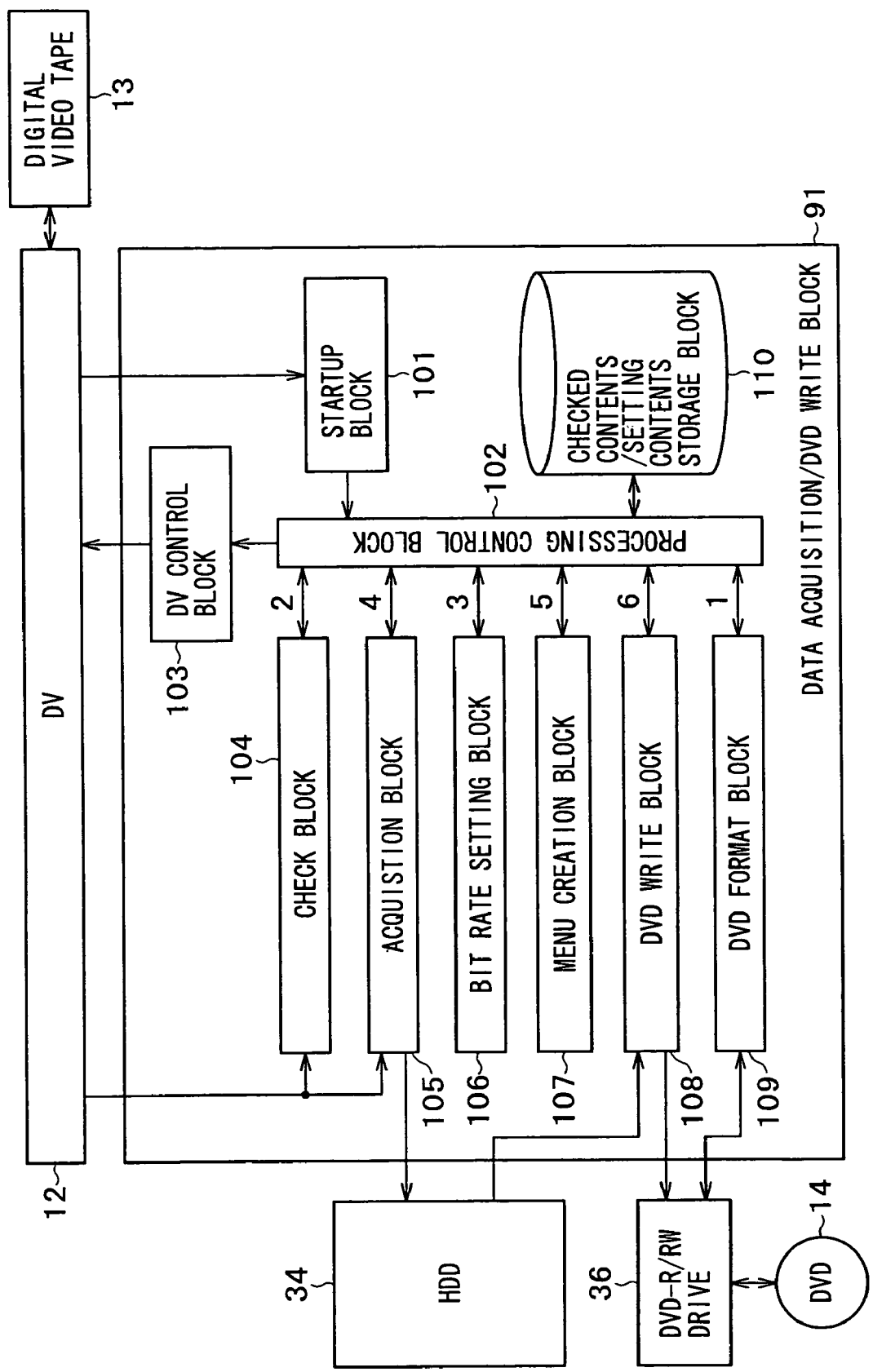
FIG. 4 is a functional block diagram illustrating an exemplary configuration of a data acquisition/DVD write block, one of software programs of the personal computer shown in FIG. 2.

Referring to FIG. 4, there is shown an exemplary configuration of a data acquisition/DVD write block 91.

As shown in FIG. 4, the data acquisition/DVD write block 91 has a startup block 101, a processing control block 102, a DV control block 103, a check block 104, an acquisition block 105, a bit rate setting block 106, a menu creation block 107, a DVD write block 108, a DVD format block 109, and a checked contents/setting content storage block 110.

Except for the checked contents/setting contents storage block 110, each of the blocks 101 through 109 is a module in this example. Each of these modules has an independent algorithm and each module executes a unique operation in accordance with its algorithm. Namely, each module is read by the CPU 21 (FIG. 2) from time to time to be executed.

To be more specific, the startup block 101 always monitors the status of the connection with the DV 12. When the DV 12 is connected to the PC 11 and the DV 12 is powered on, the startup block 101 starts up the entire data acquisition/DVD write block 91.

When the data acquisition/DVD write block 91 has been started up, the processing control block 102 executes control such that the processing operations of the check block 104 through the DVD format block 109 are sequentially and continuously executed (as a sequence of processing operations) in a predetermined sequence (In this example, in the order of numbers written over the arrow markers drawn between the processing control block 102 and each of the check block 104 through the DVD format block 109).

To be more specific, when the DVD format block 109 puts the DVD 14 loaded on the DVD-R/RW drive 36 into a write enabled state, the check block 104 checks the contents recorded to the digital video tape 13 loaded on the DV 12 and the bit rate setting block 106 sets optimum bit rates with which video data is written to the DVD 14 (a bit rate with which image data is written and a bit rate with which audio data is written) on the basis of a result of the check.

Next, the acquisition block 105 acquires the recorded data from the digital video tape 13 loaded on the DV 12, converts the format of the acquired data from DV format to DVD format, and temporarily stores the converted data to the HDD 34.

Then, the menu creation block 107 creates a DVD menu corresponding to the video data stored in the HDD 34 and the DVD write block 108 writes (or records) the video data from the HDD 34 to the DVD 14 loaded on the DVD-R/RW drive 36 on the basis of the created DVD menu.

On the basis of a command (or a request) supplied from the check block 104 or the acquisition block 105 via the processing control block 102, the DV control block 103 generates the above-mentioned control signal and transmits it to the DV 12, thereby executing control such as reproduction (including k-times reproduction), rewind, or fast forward for example of the digital video tape 13 loaded on the DV 12.

The checked contents/setting contents storage block 110 is arranged in the memory 22 (FIG. 2) for example, in which the contents of the recorded data of the digital video tape 13 checked by the check block 104 and the contents of the bit rate settings made by the bit rate setting block 106.

Figure 5:
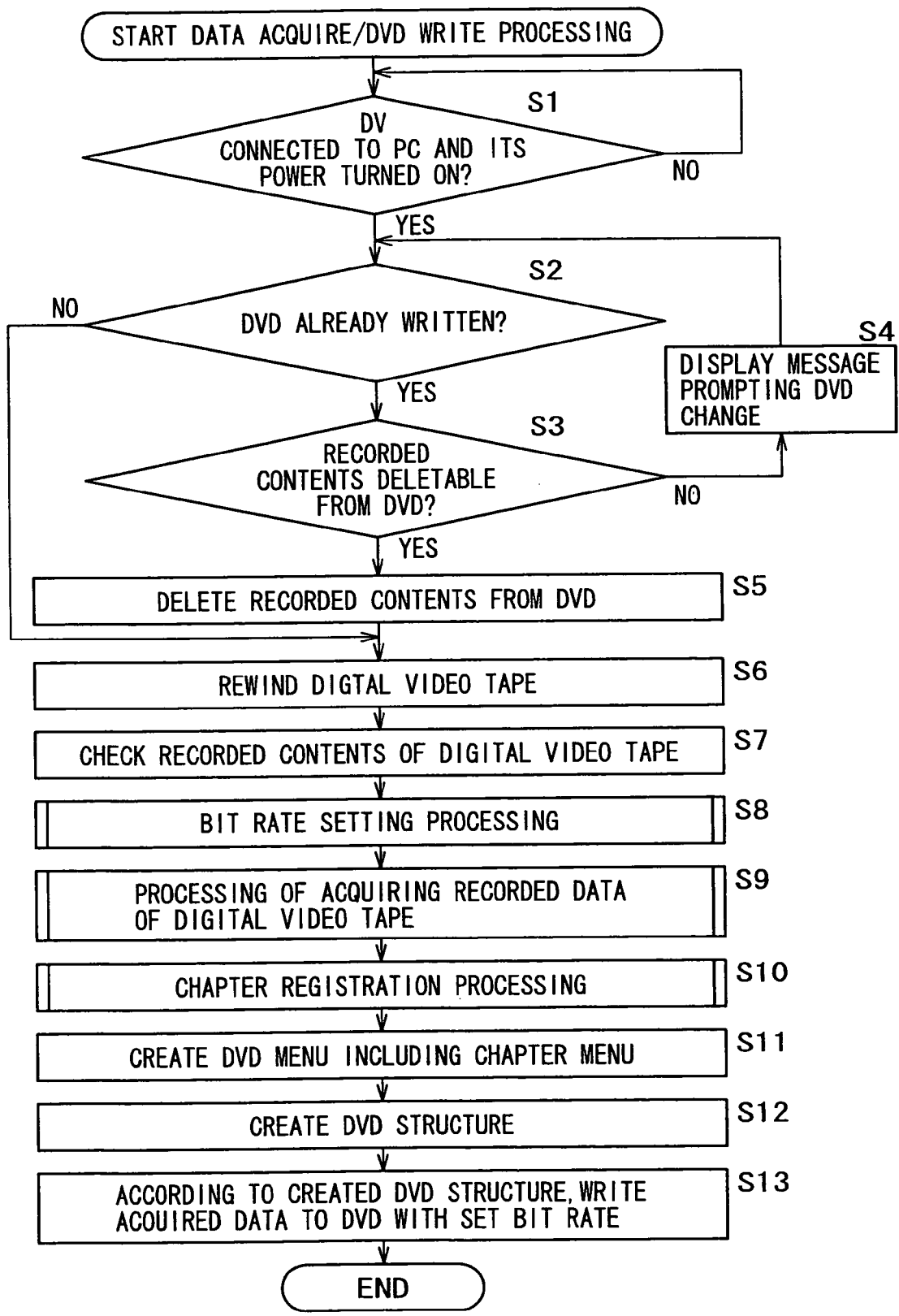
FIG. 5 is a flowchart indicative of exemplary processing by the data acquisition/DVD write block shown in FIG. 4.

The following describes the processing to be executed by the data acquisition/DVD write block 91 shown in FIG. 4 with reference to the flowchart shown in FIG. 5.

First, in step S1, the startup block 101 determines whether the DV 12 (FIG. 1) is connected to the PC 11 (FIG. 1) and its power (not shown) has bas been turned.

If the DV 12 is found not connected to the PC 11 and its power not turned on, then the startup block 101 returns its processing to step S1 to repeat the above-mentioned processing therefrom. Namely, the startup block 101 always monitors whether the DV 12 is connected to the PC 11 and its power (not shown) has been turned.

For example, if the i.LINK 78 of the DV 12 and the i.LINK 45 (FIG. 2) of the PC 11 are interconnected via the cable 15 as shown in FIG. 3 and the power of the DV 12 has been turned on, then the control block 76 of the DV 12 transmits a predetermined identification number indicative of the DV 12 to the PC 11 via the i.LINK 78 and the cable 15.

Namely, having turned on the power of the DV 12 denotes that content data (or recorded data of the digital video tape 13) is ready for reproduction. Connection with the PC 11 denotes that the PC 11 can get the content data reproduced by the DV 12. Therefore, this identification number is also a signal indicative that the DV 12 is connected to the PC 11 via the cable 15 and the content data can be reproduced by the DV 12.

Therefore, having received this identification number via the i.LINK 45 as shown in FIG. 4, the startup block 101 determines that the DV 12 has been connected to the PC 11 and its power has been turned on in step S1 shown in FIG. 5, thereby carrying its processing forward to step S2.

In step S2, the processing control block 102 executes control such that the processing operations of steps S2 through S13 to be described later are executed in a batch (or continuously) as a sequence of processing operations. In other words, when viewed from the user, the processing operations of steps S2 through S13 are automatically sequentially executed without user's manual intervention. It should be noted that the execution of processing without user's manual intervention (namely, without user's operating the jog dial 42, the keyboard 43, or the mouse 44 on the input device) by the CPU 21 own its own discretion (or in accordance with a currently executed program) is referred herein to as automatic processing.

It should be noted that, in this case, a trigger is required to start the processing (namely, the above-mentioned sequence control) by the processing control block 102. This trigger is not limited to a particular event. For example, the trigger may be the detection by the startup block 101 (namely, the detection of the connection of DV 12 to the PC 11 and the turn-on of the power of the DV 12) (namely, if the condition is found satisfied in step S1). With this trigger, the processing of step S2 may start. Alternatively, after the detection by the startup block 101, a software button (not shown) for direction the executing of the processing of steps S2 and on may be displayed on the LCD 25 (FIG. 2) for example, which is selected by the user with the mouse 44 (FIG. 2) for example by moving the cursor (not shown) of the mouse 44 to the software button and clicking the left button (not shown) of the mouse 44, thereby providing trigger. With this trigger, the processing of step S2 may start.

In step S2, on the basis of any of the above-mentioned trigger, the DVD format block 109 determines if the DVD 14 loaded on the DVD-R/RW drive 36 has already been written.

If the DVD 14 is found not already written in step S2, then the DVD format block 109 carries its processing forward to step S6.

On the other hand, if the DVD 14 is found written already, then the DVD format block 109 determines in step S3 whether the contents recorded to the DVD 14 are deletable or not.

If the contents recorded to the DVD 14 are found not deletable (or cannot be deleted) in step S3, then the DVD format block 109 displays a message prompting the exchange of the DVD 14 on the LCD 25 (FIG. 2) for example and then carries its processing backward to step S2 to repeat the above-mentioned processing therefrom. Namely, when the DVD 14 from which the contents cannot be deleted is unloaded from the DVD-R/RW drive 36 by the user and another DVD 14 is loaded on the DVD-R/RW drive 36, the DVD format block 109 determined in step S2 whether the newly loaded DVD 14 has already been written or not.

On the other hand, if the contents recorded to the DVD 14 are found deletable in step S3, then the DVD format block 109 deletes the contents from the DVD 14 in step S5.

Thus, the DVD format block 109 puts the DVD 14 into a state in which new data is writable, in the processing operations of steps S2 through S5. The sequence of these processing operations (steps S2 through S5) of the DVD format block 109 is not limited to the sequence shown in FIG. 5; that is, these processing operations may be executed in any sequence as long as they are executed before the processing of the DVD write block 108 (the processing to be executed in step S13 to be described later).

If the DVD 14 is found not already written in step S2 or if the processing of step S5 has ended, namely, the DVD format block 109 has completed its processing, then, the processing control block 102 makes the check block 104 executes its processing.

Namely, the check block 104 rewinds the digital video tape 13 loaded on the DV 12 in step S6.

To be more specific, the check block 104 requests the DV control block 103 through the processing control block 102 for the rewinding of the digital video tape 13. In response to this request, the DV control block 103 generates a control signal for directing "rewind" and transmits the generated control signal to the DV 12 through the i.LINK 45 (FIG. 2).

When the transmitted control signal is supplied to the control block 76 via the cable 15 and the i.LINK 78 as shown in FIG. 3, the control block 76 executes the processing of rewinding the digital video tape 13.

Next, detecting that the digital video tape 13 has been rewound to its beginning through the i.LINK 45 (FIG. 2), the check block 104 shown in FIG. 4 checks the contents recorded to the digital video tape 13 in step S7 shown in FIG. 5.

A method of the check to be executed in step S7 is not limited to a particular one; In this example, the following method is used.

That is, the check block 104 requests the DV control block 103 through the processing control block 102 for the fast forward reproduction of the digital video tape 13. In response to this request, the DV control block 103 generates a control signals for directing "reproduce at k-times speed (k being any positive value higher than 1) and transmits the control signal to the DV 12 through the i.LINK 45 (FIG. 2).

As shown in FIG. 3, when the transmitted control signal is supplied to the control block 76 through the cable 15 and the i.LINK 78, the control block 76 starts fast forward reproducing the digital video tape 13 at k-times speed. Then, the video signal recording/reproducing block 74 sequentially transmits the video signal reproduced from the digital video tape 13 through the head 75 to the PC 11 through the i.LINK 78 and the cable 15.

In the case of the reproduction at k-times fast forward reproduction, all frames recorded to the digital video tape 13 are not reproduced, but a predetermined number of frames are selectively reproduced. Namely, in this case, the frames located at predetermined intervals in all frames recorded to the digital video tape 13 are scanned and the data corresponding to the scanned frames are transmitted to the PC 11 from the DV 12 as a reproduced video signal. It should be noted that the digital video data format specifies the recording of 30 frames (or images) each second. The term "frame" as used herein denotes the frame specified in the digital video data format.

The check block 104 shown in FIG. 4 obtains the reproduced video signal (or the data recorded to the scanned frames) through the i.LINK 45 (FIG. 2) and, from the obtained frame data, further obtains the time information of each frame.

To be more specific, the frame data includes not only the video data (image and audio data) corresponding to that frame, but also the information about the frame number of that frame and the time information such as the information about the time (year, month, day, hour, minute, and second) at which that frame was taken and, if that frame is located at the recording start point, the information indicative of that point (hereafter referred to as recording start point information). It should be noted that a position (or a point) on the digital video tape 13 at which the take started by pressing a record button (not shown) on the operator block 77 by the user shown in FIG. 3 is referred to as a recording start point. It should also be noted that the frame immediately preceding the frame having recording start point information is referred, for the sake of description, to as a frame having recording end point information. Namely, the frame having recording end point information does not sometimes include the specific information associated with recording end point information.

Consequently, the check block 104 shown in FIG. 4 obtains the time information of such frame (that has been scanned) and, on the basis of the obtained time information, checks the contents recorded to the digital video tape 13.

To be more specific, having detected the frame that includes recording start point information, the check block 104 obtains the time information of the detected frame. Next, having detected the frame that includes recording end point information, the check block 104 obtains the time information of the detected frame. Then, the check block 104 recognizes an section from the frame including recording start point information to the frame including recording end point information as one recording section and generates the time information about this recording section. Namely, the check block 104 generates the time information about the recording section, including the start time (year, month, day, hour, minute, and second) of the recording section, the end time (year, month, day, hour, minute, and second) of the recording section and the length (or duration) of that recording section.

Meanwhile, generally, with the DVD 14, all recorded data are divided into a plurality of recording sections in advance. When a predetermined operation is executed, the reproduction of an arbitrary recording section is enabled from its beginning. These recording sections on the DVD 14 are generally called chapters. In the present embodiment, if the recorded data of the digital video tape 13 captured in the PC 11 is written (or recorded) to the DVD 14, one recording section from a predetermined recording start point to the recording end point that appears next in the recorded data of the digital video tape 13 is handled as one chapter of the DVD 14. Therefore, such recording section between the recording start point and the recording end point is also called a chapter also before being recorded to the DVD 14.

It should be noted, however, that, as described above, in this case, the frames that can be checked by the check block 104 (or that can be actually obtained by the check block 104) are only scanned frames and therefore the frames having recording start point and recording end point are not always scanned. Therefore, the check block 104 compares the take time of the first frame obtained this time with the take time of the second frame obtained immediately before. If the section between these frames is found separated more than a predetermined time, then the check block 104 recognizes that the first and second frames are different chapters. Namely, the CPU 21 (FIG. 2) regards the second frame obtained immediately before as a frame that includes recording end point information (as a last frame of the target chapter checked for far) and regards the first frame obtained this time as a frame that includes recording start point information (as the start frame of a next chapter (to be checked next) following the target chapter), thereby recognizing the section between the second frame and the first frame as a chapter section.

Thus, every time a chapter is recognized, the check block 104 generates the time information of the newly recognized chapter.

Figure 6:
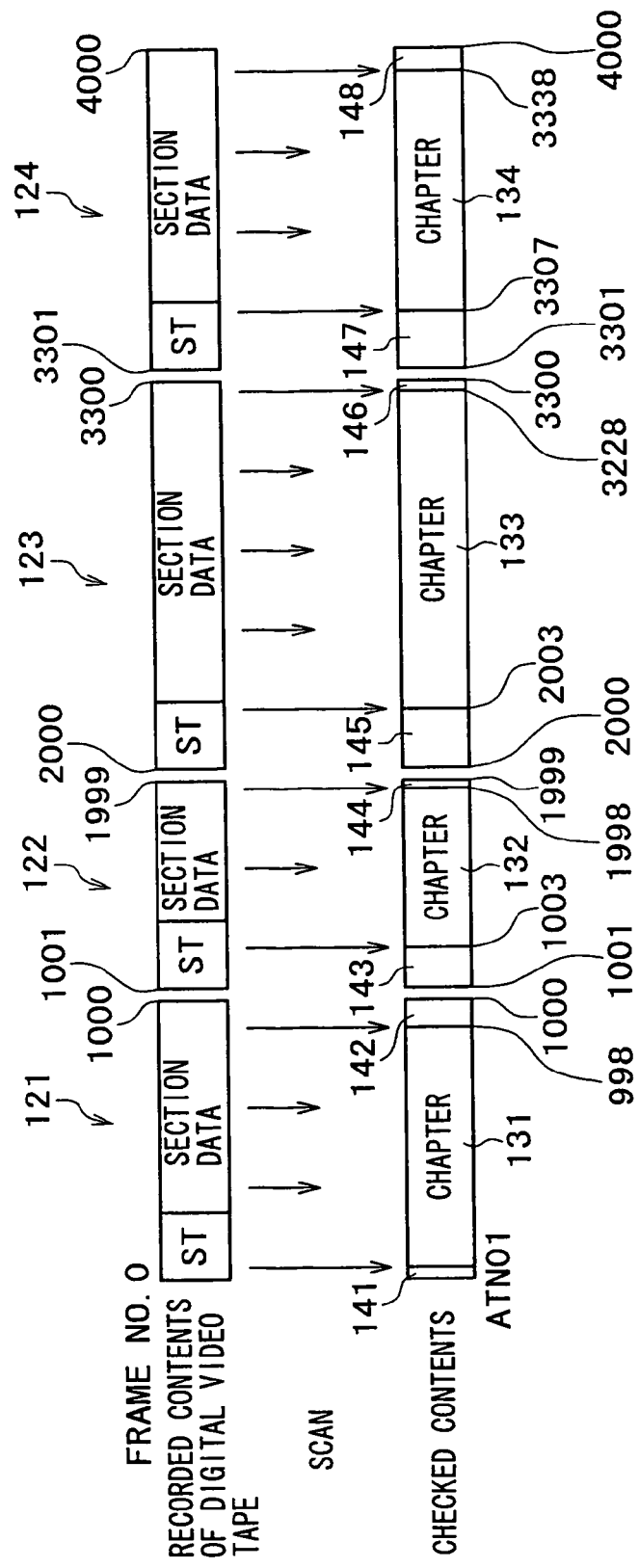
FIG. 6 is a diagram illustrating an example of the checked contents of a digital video tape.

To be more specific, it is supposed as shown in FIG. 6 for example that a part of the recording contents of the digital video tape 13 is configured by recording section 121 made up of frames 0 through 1000, recording section 122 made up of frames 1001 through 1999, recording section 123 made up of frames 2000 through 3300, and a recording section 124 made up of frames 3301 through 4000. It should be noted that, in the figure, a area (frames for one second (30 frames)) indicated by "ST" in each of the sections 121 through 124 denotes an area (frames) in which the above-mentioned recording start point information and so on are stored as attached to the video data and an area indicated by "section data" denotes an area in which only the video data is stored.

In this case, as described above with reference to FIG. 4, when the check block 104 checks the recorded contents of the digital video tape 13, only the frames scanned by fast forward reproduction are supplied. Therefore, the contents checked in the processing of step S7 (FIG. 5) by the check block 104 are not actual recording sections 121 through 124 but chapters (or section data) 131 through 134, as shown in the checked contents in FIG. 6.

Namely, in the example shown in FIG. 6, in the recording section 121, the data of frames 1 through 998 is recognized as chapter 131 and the data of frame 0, frame 999, and frame 1000 are not recognized as chapter 131.

In recording section 122, data of frames 1003 through 1998 is recognized as chapter 132 and the data of frame 1001, frame 1002, and frame 1999 are not recognized as chapter 132.

In recording section 123, the data of frames 2003 through 3228 is recognized as chapter 133 and the data of frames 2000 through 2002, frame 3229, and frame 3300 are not recognized as chapter 133.

In recording section 124, the data of frames 3307 through 3338 is recognized as chapter 134 and the data of frames 3301 through 3306, frame 3339, and frame 4000 are not recognized as chapter 134.

It should be noted that data 141 through 148 not recognized in the processing of step S7 (FIG. 5) as shown in FIG. 6 are referred to as unrecognized data.

Having detected, through the i.LINK 45 (FIG. 2), the fast forward reproduction of the digital video tape 13 to its end, the check block 104 generates a chapter lists (not shown) listing the time information of each chapter recognized so far, totals the times (the period of time from chapter start time to chapter end time) of the listed chapters, and adds the time of the unrecognized data to the obtained total, thereby computing total time Tx of the recorded data of the digital video tape 13.

It should also be noted that, as described above, the start frame and the end frame of each chapter included in the chapter list do not always match the start frame and end frame of an actual recording section. For example, as shown in FIG. 6, the start frame of recording section 121 is the frame having frame number 0 and the end frame is the frame having frame number 1000. On the other hand, the start frame of chapter 131 recognized by the check block 104 (FIG. 4) is the frame having frame number 1 and its end frame is the frame having frame number 998.

Of the start frames and the end frames of the chapters included in the chapter list, the check block 104 attaches a predetermined flag (hereafter referred to as an ambiguous flag) to each frame not including recording start point information or recording end point information and adds this ambiguous flag as the information of the chapter list.

Thus, In this example, the check block 104 checks the time information (or the chapter list) of each of the chapters and total time Tx of the recorded data as the recorded contents of the digital video tape 13. Then, the check block 104 stores the checked recorded contents (the chapter list and total time Tx) into the checked contents/setting contents storage block 110 through the processing control block 102. It should be noted that the contents (the contents of the recorded data of the digital video tape 13 to be checked in the processing of step S7 (FIG. 5)) to be stored in the checked contents/setting contents storage block 110 may obviously be information other than described above.

When the recorded contents of the digital video tape 13 have been stored in the checked contents/setting contents storage block 110, the processing control block 102 makes the bit rate setting block 106 executes its processing.

Namely, in step S8 shown in FIG. 5, on the basis of total time Tx of the recorded data of the digital video tape 13 just stored in the checked contents/setting contents storage block 110, the bit rate setting block 106 determines the picture quality, image size, and sound (audio data) quality of the moving image (image data) if the recorded data of the digital video tape 13 is written (or recorded) to the DVD 14 loaded on the DVD-R/RW drive 36 in step S13 to be described later.

Of the recorded data of the digital video tape 13, image quality, image size, and sound quality depends on bit rates (the bit rate of image when image data is written and the bit rate of audio when audio data is written) with which the recorded data of the digital video tape 13 is written to the DVD 14. Namely, in the processing of step S8, on the basis of total time Tx of the recorded data of the digital video tape 13, optimum bit rates among those with which all recorded data of the digital video tape 13 are writable are selectively set within a range of the maximum capacity (or the writable capacity) of the DVD 14.

Therefore, the processing of step SB is hereafter referred to as "bit rate setting processing". "Bit rate setting processing" of this example will be described in detail later with reference to the flowchart shown in FIG. 7.

After the above-mentioned processing of the bit rate setting block 106, the processing control block 102 makes the acquisition block 105 execute its processing. Namely, in step S9 shown in FIG. 5, the acquisition block 105 acquires the recorded data of the digital video tape 13 from the DV 12 through the i.LINK 45 (FIG. 2) and temporarily stores the received data into the HDD 34. Further, the acquisition block 105 converts the format of the video data stored in the HDD 34 from DV format into DVD format (for example, MPEG-2 format), stores the format-converted video data into the HDD 34, and deletes the video data having DV format from the HDD 34. This processing of step S9 is hereafter referred to as "digital video tape recorded data acquisition processing". It should be noted that "digital video tape recorded data acquisition processing" In this example will be described in detail later with reference to FIGS. 10 through 18.

Meanwhile, the DVD 14 can also record a menu called a DVD menu, in addition to actual video data. In accordance with this DVD menu, the user can execute various operations associated with the reproduction of the video data recorded to the DVD 14. In addition, a menu called a chapter menu can be included in this DVD menu. The user can select desired chapters from the chapter menu, starting the reproduction of the selected chapters from their start position.

So, after the processing by the acquisition block 105, the processing control block 102 makes the menu creation block 107 executes its processing. Namely, in step S10, the menu creation block 107 selects a predetermined chapter from among the chapters included in the chapter list (actually, the chapter list updated in the processing of step S9, which will be described later) generated in step S7 and stored in the checked contents/setting contents storage block 110, registers the selected chapter with the chapter menu, and generates a final chapter menu (to be written to the DVD 14). This processing of step S10 is referred to as "chapter registration processing". It should be noted that "chapter registration processing" In this example will be described later with reference to the flowchart shown in FIG. 19.

After "chapter registration processing" of step S10, the menu creation block 107 creates, in step S11, a DVD menu that includes the chapter menu generated in step S10.

When the DVD menu has been created by the menu creation block 107, the processing control block 102 makes the DVD write block 108 execute its processing. Namely, having created a DVD structure in step S12, then, in step S13, DVD write block 108 writes the video data (the video data in DVD format stored in the HDD 34) acquired by the acquisition block 105 in step S9 to the DVD 14 loaded on the DVD-R/RW drive 36 with the bit rate set by the bit rate setting block 106 in step S8 (namely, the bit rate stored in the checked contents/setting contents storage block 110) in accordance with the created DVD structure. It should be noted that the data structures such as the location and layer of the data to be recorded to the DVD 14 are generically referred to as a DVD structure.

Thus, the data acquisition/DVD write block 91 shown in FIG. 4 for executing, in a bulk (or continuously) a sequence of processing operations such as acquiring the recorded data of the digital video tape 13 from the DV 12 and recording the acquired data to the DVD 14 loaded on the DVD-R/RW drive 36 is installed beforehand in the HDD 34 for example of the PC 11 shown in FIG. 2. Therefore, when the startup block 101 of the data acquisition/DVD write block 91 detects that the DV 12 is connected to the PC 11 and its power has been turned on, the data acquisition/DVD write block 91 automatically starts up, executing its processing (a sequence of processing operations of steps S2 through S13) without the manual intervention of the user (namely, automatically).

In other words, the PC 11 comprises connection means for connecting to a reproduction device for reproducing content data recorded in a first format; content data acquisition means for acquiring the content data reproduced by the reproduction device connected to the connection means; conversion means for converting a format of the content data acquired by the content data acquisition means from the first format to a second format; recording control means for executing control such that the content data converted to the second format by the conversion means is recorded from the information processing apparatus to a predetermined removable recording medium; detection means for detecting a signal supplied from the reproduction device indicative that the reproduction device is connected to the connection means and reproduction of the content data by the reproduction device is ready; and processing control means for executing control such that, if the signal is detected by the detection means, processing by the content data acquisition means, processing by the conversion means, and processing by the recording control means are continuously executed in this order.

Namely, without special operations by the user (that is, by simply connecting the DV 12 to the PC 11 and turning on its power (or as required, simply by clicking a software button for directing the execution of the data acquisition/DVD write block 91 with the mouse 44)), the recorded data of the digital video tape 13 is automatically captured from the DV 12 into the PC 11 to be automatically recorded to the DVD 14 loaded on the DVD-R/RW drive 36.

Therefore, the data acquisition/DVD write block 91 can solve the above-mentioned problems inherent to the related-art techniques.

It should be noted that, in FIG. 2, the video data automatically captured in the PC 11 can be recorded not only to the DVD 14 loaded on the DVD-R/RW drive 36, but also to various other recording media including a CD-R (not shown) loaded on the CD-ROM drive 35, the Memory Stick 32 loaded in the Memory Stick slot 31, and the removable recording medium 49 loaded on the drive 48, for example.

The following describes the details of the above-mentioned "bit rate setting processing (step S8)", "digital video tape recorded data acquisition processing (step S9)", and "chapter registration processing (step S10)" in this order with reference to drawings.

Figure 7:
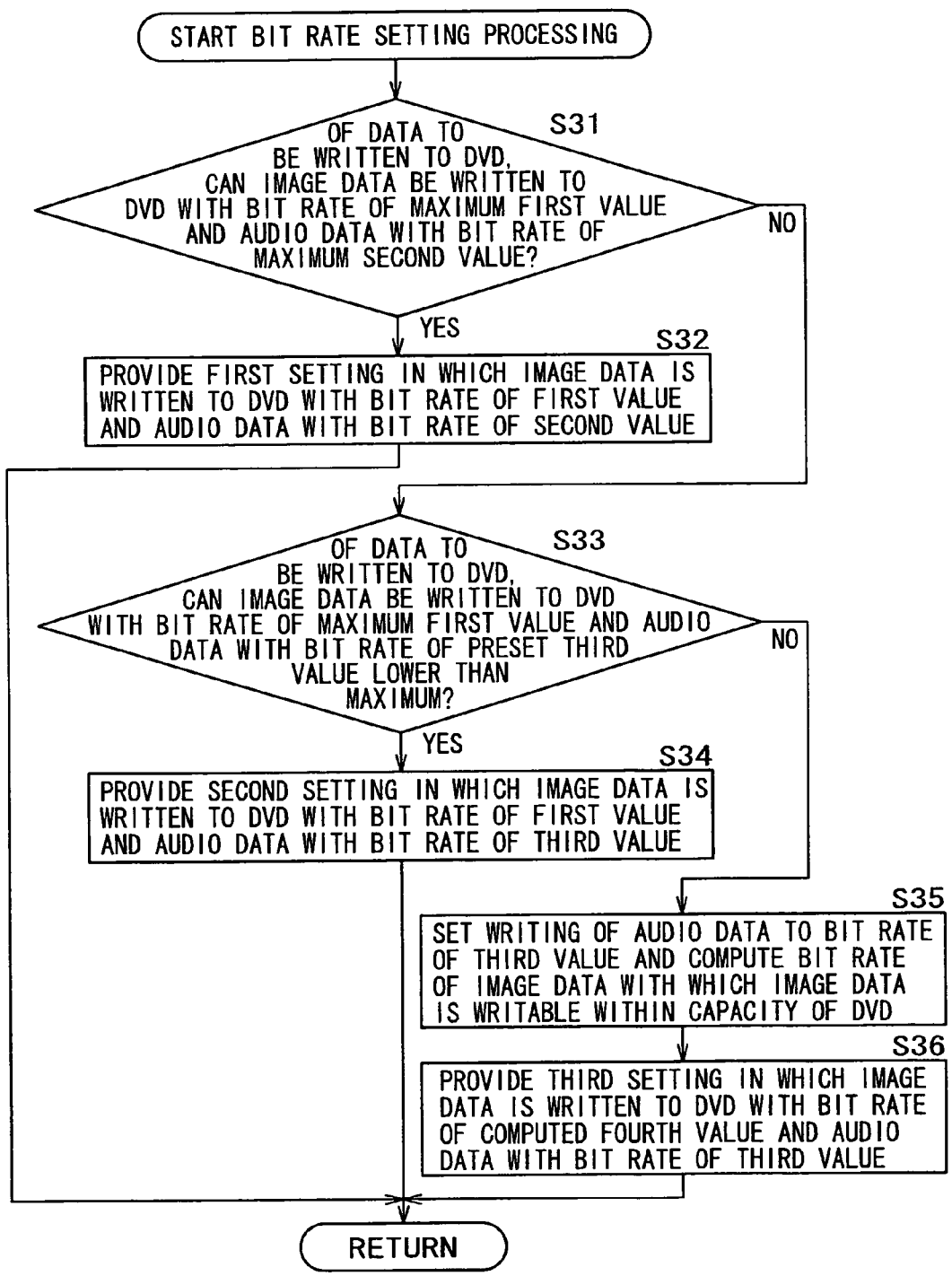
FIG. 7 is a flowchart indicative of an example of the details of bit rate setting processing of the data acquisition/DVD write processing shown in FIG. 5.

First, "bit rate setting processing" In this example will be described with reference to the flowchart shown in FIG. 7.

In step S31, the bit rate setting block 106 shown in FIG. 4 determines whether the image data can be written to the DVD 14 with a bit rate of maximum first value and the audio data with a bit rate of maximum second value, in the data (the recorded data of the digital video tape 13) to be written to the DVD 14, on the basis of total time Tx of the recorded data of the digital video tape 13 checked by the check block 104 in step S7 (FIG. 5) and stored in the checked contents/setting contents storage block 110.

In this example, the first value (the maximum value) of the bit rate of image is 8 Mbps and the second value (the maximum value) of the bit rate of audio is 1.567 Mbps specified in non-compressed straight rate PCM (Pulse Coded Modulation), for example.

In this case, determines in step S31 whether inequality (1) shown below is established, thereby determining whether, of the data to be written to the DVD 14, the image data can be written to the DVD 14 with a bit rate of maximum first value and the audio data with a bit rate of maximum second value.

$$(B1+B2) \times Tx < C\max \quad (1)$$

In inequality (1), B1 denotes the first value (bps) of the bit rate of image, B2 denotes the second value (bps) of the bit rate of audio, Tx denotes to total time (seconds) of the video data to be written to the DVD 14 (to total time (seconds) of the recorded data of the digital video tape 13 stored in the checked contents/setting contents storage block 110), and Cmax denotes a maximum recordable capacity (bits) of the DVD 14.

If inequality (1) is found established in step S31, then, in step S32, the bit rate setting block 106 provides a first setting in which the image data is written to the DVD 14 with the bit rate of first value B1 and the audio data with the bit rate of second value B2 (in non-compressed straight PCM format), upon which the bit rate setting block 106 returns its processing.

On the other hand, if inequality (1) is found not established in step S31, then the bit rate setting block 106 determines in step S33 whether the image data of the data to be written to the DVD 14 can be written thereto with the bit rate of maximum first value and the audio data with a predetermined bit rate of third value lower than the maximum second value.

In this example, the third value of the bit rate for audio data is 0.384 Mbps specified in the compressed format of Dolby AC-3, for example.

In this case, the bit rate setting block 106 determines in step S33 whether inequality (2) shown below is established, thereby determining whether the image data of the data to be written to the DVD 14 can be written thereto with the bit rate of first value and the audio data with the bit rate of third value.

$$(B1+B3) \times Tx < C\max \quad (2)$$

In inequality (2), B3 denotes the third value (pbs) of the bit rate for audio data.

If inequality (2) is found established in step S33, then the bit rate setting block 106 provides, in step S34, a second setting in which the image data is written to the DVD 14 with the bit rate of first value B1 and the audio data with the bit rate of third value B3 (namely, in the compressed format of Dolby AC-3), upon which the bit rate setting block 106 returns its processing.

On the other hand, if inequality (2) is found not established in step S33, then, in step S35, the bit rate setting block 106 sets the writing of the audio data to the bit rate of third value B3, computing the bit rate of the image data that can be written within the capacity of the DVD 14.

In this example, the bit rate setting block 106 computes value B4 of a bit rate of the image data that satisfies inequality (3) shown below, for example.

$$(B4+B3) \times Tx < C\max \quad (3)$$

In inequality (3), B4 denotes a fourth value of the bit rate of the image data that is set (or computed) in step S35.

Next, the bit rate setting block 106 provides a third setting in which the image data is written to the DVD 14 with the bit rate of fourth value B4 computed in step S35 and the audio data with the bit rate of third value B3 (in the compressed format of Dolby AC-3), upon which the bit rate setting block 106 returns its processing.

Figure 8:
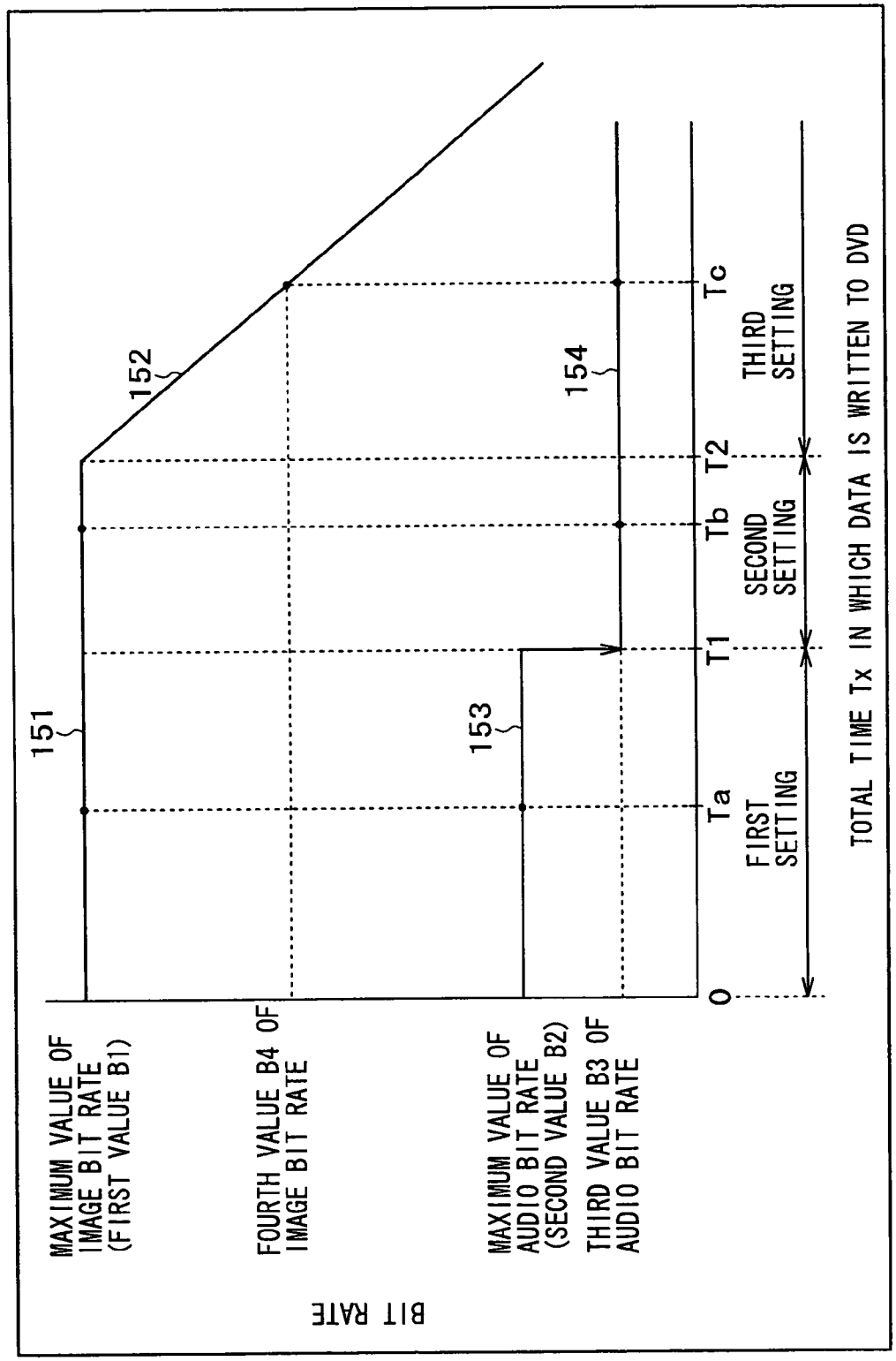
FIG. 8 is a graph indicative of an exemplary relationship between the total time of data to be written to a DVD and bit rates.
Figure 9:
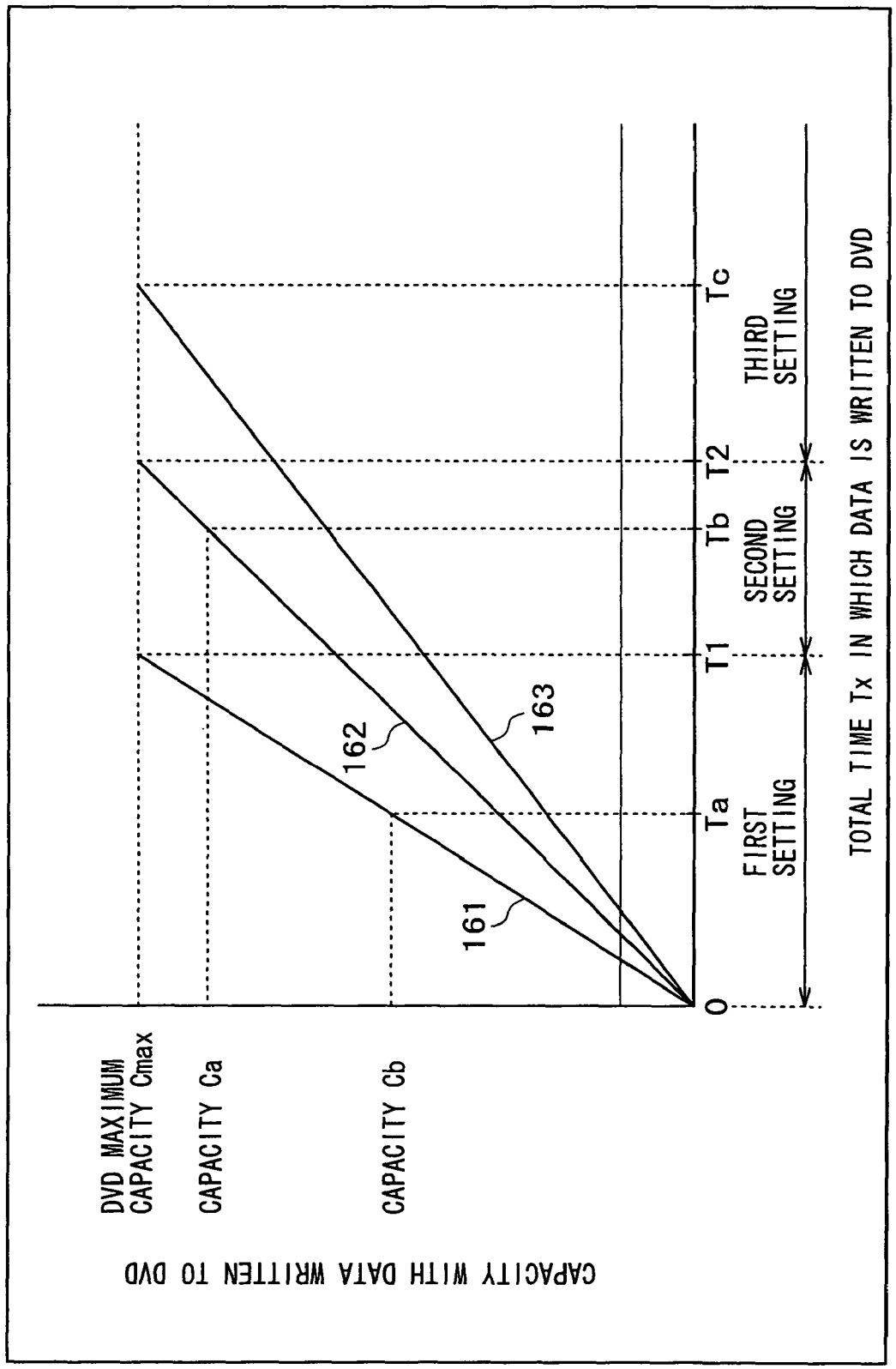
FIG. 9 is a graph indicative of an exemplary relationship between the total time of data to be written to a DVD and the capacities with the data written.

The following describes a specific example of "bit rate setting processing" with reference to FIGS. 8 and 9.

FIG. 8 shows a relationship between total time Tx of the data to be written to the DVD 14 (total time Tx of the recorded data of the digital video tape 13 checked in step S7 (FIG. 5)) and the bit rates to be set. FIG. 9 shows a relationship between total time Tx of the data to be written to the DVD 14 and the data capacities when the data is written to the DVD 14.

For example, it is supposed that there exist, as the data to be written to the DVD 14, data Da with total time Tx=Ta (total time Ta denotes time below maximum time T1 to which the first setting is applied), data Db with total time Tx=Tb (total time Tb denotes time below maximum time T2 to which the second setting is applied), and data Dc with total time Tx=Tc (total time Tc denotes time within a range to which the third setting is applied).

In this case, with data Da, the first setting is provided. Namely, because the total time of data Da is time Ta, first value B1 which is the maximum value of image is set to the bit rate of image as indicated with line 151 shown in FIG. 8 and second value B2 which is the maximum value of audio is set to the bit rate of audio as indicated with line 153 shown in FIG. 8 (non-compressed straight PCM format is set). Therefore, as indicated with a line 161 shown in FIG. 9, if data Da is written to the DVD 14, then capacity Cb of all capacity (or maximum capacity Cmax) writable on the DVD 14 is used (or recorded).

With data Db, the second setting is provided. Namely, because the total time of data Db is time Tb, first value B1 which is the maximum value of image is set to the bit rate of image as indicated with line 151 shown in FIG. 8 and third value B3 which below maximum value B1 of audio is set to the bit rate of audio as indicated with line 154 shown in FIG. 8 (compressed format such as Dolby AC-3 is set). Therefore, as indicated with line 162 shown in FIG. 9, if data Db is written to the DVD 14, then capacity Ca of all capacity (or maximum capacity Cmax) writable on the DVD 14 is used (or recorded).

With data Dc, the third setting is provided. Namely, because the total time of data Dc is time Tc, fourth value B4 determined by a characteristic in which the bit rate linearly decreases as total time Tx increases (in the example shown in FIG. 8, the characteristic indicated with line 152) is set to the bit rate of image (computed in step S35) and third value B3 as indicated with line 154 shown in FIG. 8 is set to the bit rate of audio (compressed format such as Dolby AC-3 is set). Therefore, as indicated with line 163 shown in FIG. 9, if data Dc is written to the DVD 14, up to writable maximum capacity Cmax of the DVD 14 is used (or recorded).

Thus, if total time Tx of the data to be written to the DVD 14 (namely, total time Tx of the recorded data of the digital video tape 13 checked in step S7 (FIG. 5)) is lower than time T1, then the first setting in which both the bit rates of image and audio are the maximum (first value B1 of image and second value B2 of audio) is provided.

If total time Tx is longer than time T1 and shorter than time T2, the second setting in which the bit rate of image is left unchanged and only the bit rate of audio is lowered (namely, the third value lower than the second value is specified) is provided.

In the second setting, the image quality is left unchanged and the sound quality is reduced first as described above in this example. Obviously, the image quality may be lowered first, with the sound quality left unchanged. However, because of the reasons shown below, the second setting of this example (namely, the sound quality is lowered first with the image quality left unchanged) is preferred. The first reason is that, as compared with the image quality, the deterioration due to the reduction of the bit rate of the sound quality is barely transmitted to the user. In other words, if the audio bit rate is lowered from second value B2 to third value B3, human auditory sense can hardly detects the deterioration due to the lowering. The second reason is that many users prefer the image quality to the sound quality, in general.

The method of lowering the bit rate of audio is not limited to particular one; for example, as fourth value B4 of the bit rate of image is computed (as indicated with line 152 shown in FIG. 8), the bit rate of audio may be gradually (continuously) lowered in accordance with the length of total time Tx. However, for the following two reasons, a method of lowering the audio bit rate is preferred in which the bit rate is lowered, over a certain point (time T1), from second fixed value B2 to third fixed value B3 in a discontinuous manner, as described above. The first reason is the same as the above-mentioned first reason. The second reason, or the third reason if this is the continuation from the above-mentioned first and second reasons, is that second value B2 itself which is the highest audio bit rate value is fairly lower than the bit rate of image, so that the gradual lowering of the audio bit rate does not significantly contribute to the saving of the capacity in which the data is written to the DVD 14.

If total time Tx is longer than time T2, then the third setting in which the image bit rate is lowered is provided.

The method of lowering the image bit rate is not limited in particular; for example, a method may be used in which, as with the audio bit rate, the bit rate is lowered over a certain point in a discontinuous manner. However, for the reasons that are reverse to those for the audio bit rate, the method is preferred in which the bit rate is gradually (continuously) lowered in accordance with the length of total time Tx as fourth value B4 is computed (in accordance with line 152 shown in FIG. 8) as described above. Namely, as compared with the audio bit rate, the deterioration in image quality due to the lowering of the bit rate is easily transmitted to the user (namely, the deterioration in image quality is often acutely detected by the human visual sense), which is the fourth reason (reverse to the above-mentioned first reason). The fifth reason (reverse to the above-mentioned third reason) is that first value B1 which is the highest value of image is fairly high, so that the lowered bit rate of image significantly contributes to the saving of the capacity of the dada to be written to the DVD 14.

Thus, the bit rate setting block 106 shown in FIG. 4 executes "bit rate setting processing", so that the following advantages are achieved.

Conventionally, when writing the video data (namely, the recorded data of the digital video tape 13) taken with the DV 12 to a DVD, the user manually computes total time Tx of the recorded data of the digital video tape 13 (or manually has total time Tx computed by the PC), manually computes, from the obtained total time Tx, the bit rate for use in the case of writing the data to the DVD, manually registers the obtained bit rate into the PC, manually starts up the data acquisition program of the PC to capture the recorded data of the digital video tape 13 from the DV 12 into the PC, and, after starting up the data acquisition program, manually starts up the DVD write program to write the video data captured in the PC to the DVD with the registered bit rate (namely, the manually computed bit rate).

For the user to manually compute the bit rates, it is required to know DVD standards, DV standards, various other standards, and the information accompanying thereto, and has high-level techniques to handle these knowledge and information. In addition, it is still very difficult even for those users who have these high-level knowledge and techniques to compute the bit rates that satisfy desired image and audio qualities (generally, the highest image and audio qualities within a range of DVD capacity).

It is also practicable for the user to directly connect a device such as a DVD-R recorder to the DV 12 without using the PC, writing the video data taken with the DV 12 (namely, the recorded data of the digital video tape 13) to a DVD loaded on the DVD-R recorder. However, this presents a problem that, because bit rates preset to the DVD-R recorder are used in this case, the video data is not always recorded to the DVD with optimum bit rates (of image quality and sound quality).

Conversely, as described above, in the PC 11 (FIG. 2), the bit rate setting block 106 is provided as one of the functions of the data acquisition/DVD write block 91 (FIG. 4). Namely, without performing any special operation (namely, by only connecting the DV 12 to the PC 11 and turning on the power to the DV 12 by the user), the optimum bit rates with which the data (namely, the recorded data of the digital video tape 13) is written to the DVD 14 are automatically set.

In other words, the PC 11 comprises checking means for checking predetermined time information of content data recorded in a first format; setting means for setting, on the basis of the content data time information checked by the checking means, bits rates with which the content data is recorded from the information processing device to a predetermined removable recording medium; and recording control means for converting the format of the content data from the first format to a second format and recording the converted content data to the recording medium with the bit rates set by the setting means.

Thus, the bit rate setting block 106 executes "bit rate setting processing", thereby providing an advantage of solving the above-mentioned problem associated with the bit rate setting of the related-art techniques.

Figure 10:
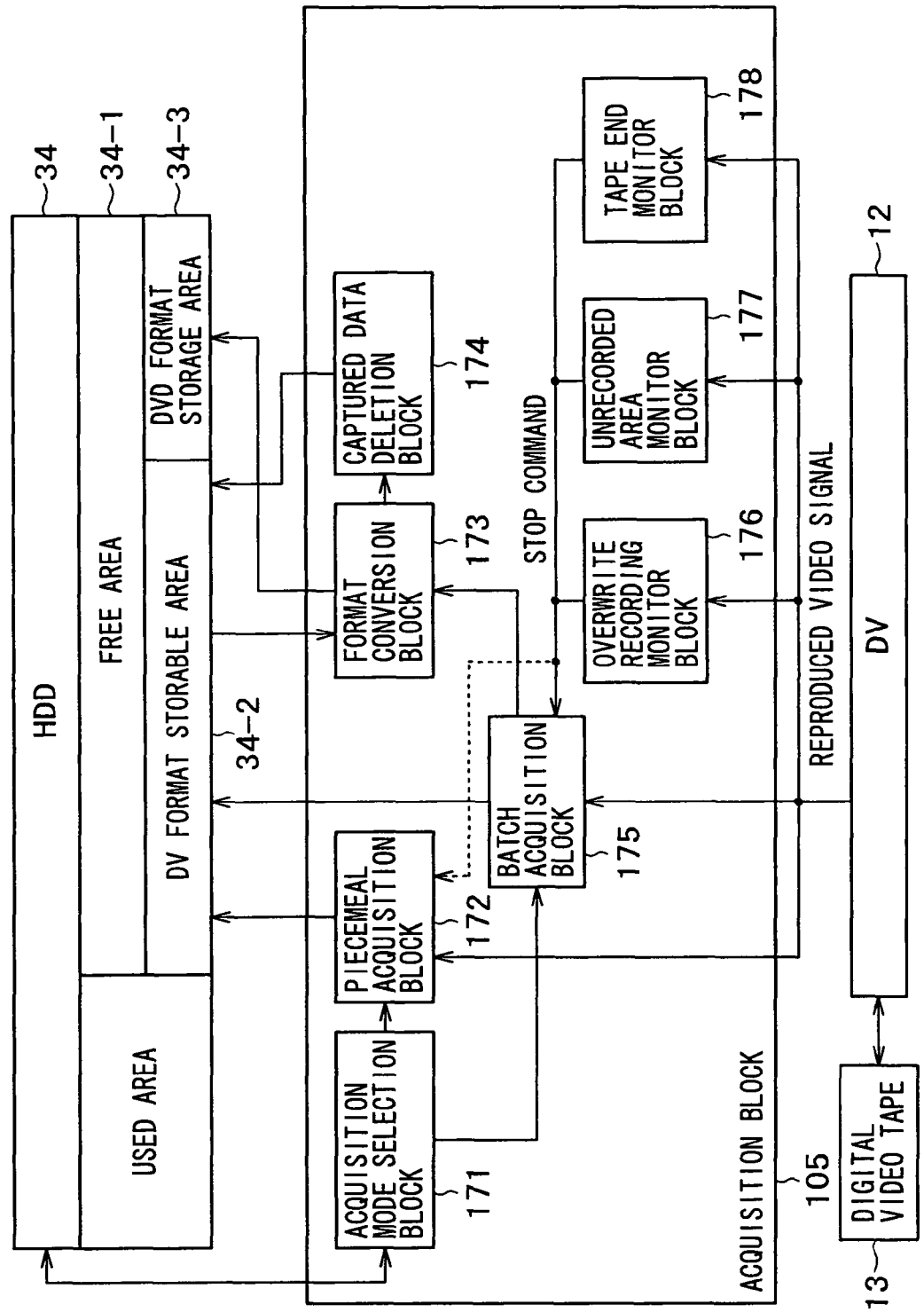
FIG. 10 is a functional block diagram illustrating an exemplary configuration of the acquisition block of the data acquisition/DVD write block shown in FIG. 4.
Figure 11:
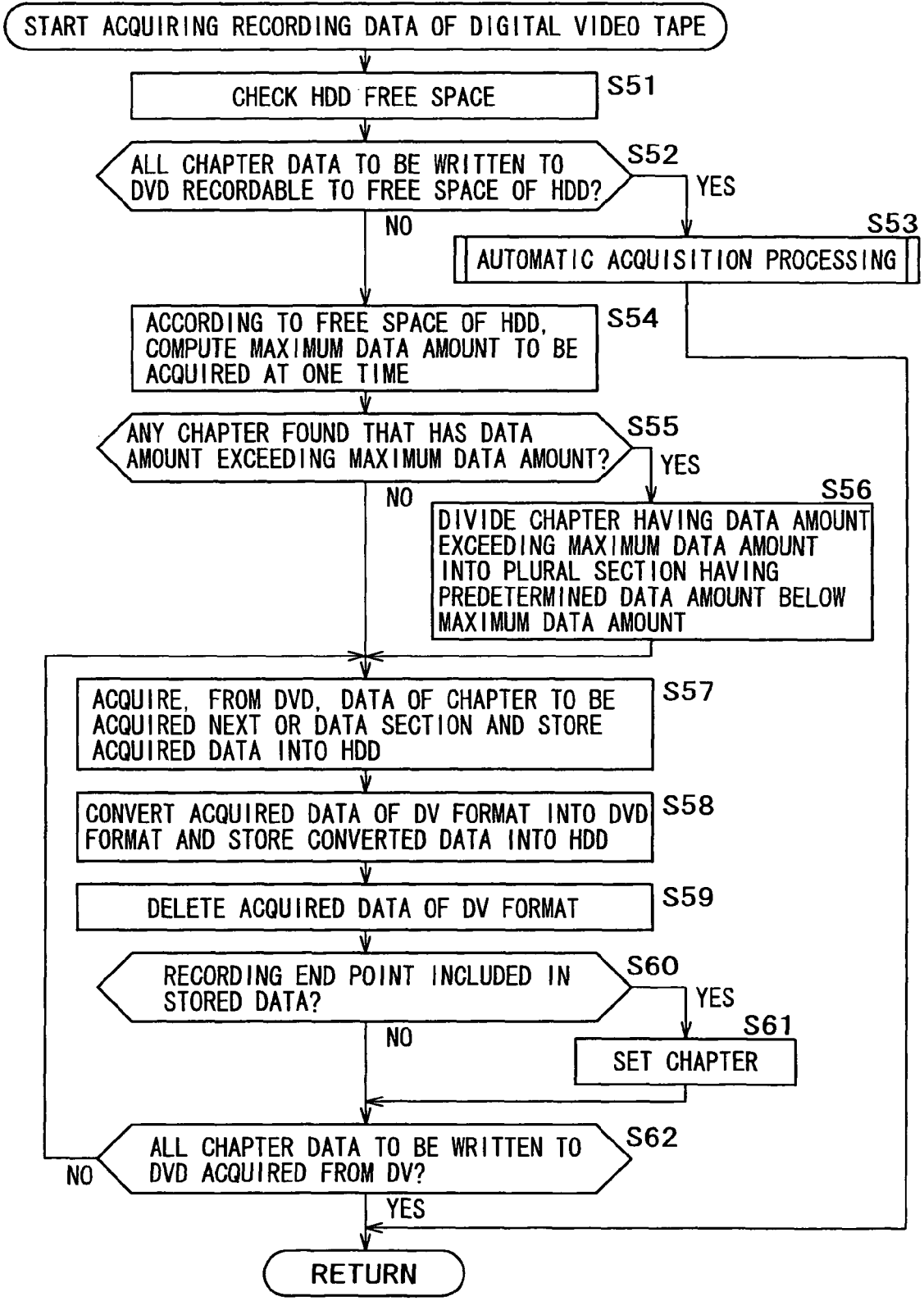
FIG. 11 is a flowchart indicative of an example of the details of the processing of acquiring recorded data from the digital video tape, of the data acquisition/DVD write processing shown in FIG. 5.

The following describes details of "digital video tape recorded data acquisition processing" of this example that is executed by the acquisition block 105 (FIG. 4) with reference to FIGS. 10 and 11.

Referring to FIG. 10, there is shown a detail exemplary configuration of the acquisition block 105.

As shown in FIG. 10, the acquisition block 105 has an acquisition mode selection block 171 for checking the free capacity of the HDD 34 and selecting a mode of capturing the recorded data of the digital video tape 13 from the DV 12; a piecemeal acquisition block 172 for, if the mode of acquiring the data in a divided manner is selected by the acquisition mode selection block 171, dividing the recorded data of the digital video tape 13, sequentially capturing the divided data from the DV 12 in the DV format, and storing the captured data into a DV format storage enabled area 34-2 to be described later in the HDD 34; format conversion block 173 for converting the format of the video data stored in the DV format storage enabled area 34-2 of the HDD 34 from DV format to DVD format and storing the converted video data into a DVD format storage area 34-3 in the HDD 34; and a captured data deletion block 174 for deleting the video data of DV format from the DV format storage enabled area 34-2 in the HDD 34.

The acquisition block 105 also has a batch acquisition block 175 for, if a mode of selecting data in a bulk manner is selected by the acquisition mode selection block 171, capturing in one lump the recorded data of the digital video tape 13 from the DV 12 in DV format and storing the captured data into the DV format storage enabled area 34-2 in the HDD 34; and an overwrite recording monitor block 176 for instructing the bulk acquisition block 175 (or the piecemeal acquisition block 172 as required) to stop the acquisition processing if the recorded data of the digital video tape 13 to be captured is overwritten on old video data and when the reproduction of the digital video tape 13 proceeds from the recorded data to be captured to the old video data.

Additionally, the acquisition block 105 has an unrecorded area monitor block 177 for instructing the bulk acquisition block 175 (or the piecemeal acquisition block 172 as required) to stop the acquisition processing like the overwrite recording monitor block 176 and a tape end monitor block 178. The unrecorded area monitor block 177 outputs a stop command if the unrecorded area continues longer than a certain period of time during the reproduction of the digital video tape 13. The tape end monitor block 178 outputs a stop command if the digital video tape 13 has been reproduced up to its end.

The following describes the details of "digital video tape recorded data acquisition processing" in this example with reference to FIG. 11.

First, in step S51, the acquisition mode selection block 171 checks the capacity (hereafter referred to as a free capacity) of the free area 34-1 in the 34. In step S52, the acquisition mode selection block 171 determines whether the data of all chapters to be written to the DVD can be stored in the checked free capacity of the HDD 34.

To be more specific, in this example, acquisition mode selection block 171 computes recording capacity Cd of the DVD 14 by multiplying total time Tx of the recorded data of the digital video tape 13 checked by the check block 104 (FIG. 4) in the processing of step s7 (FIG. 5) stored in the checked contents/setting contents storage block 110 (FIG. 4) by the bit rate set by a bit rate setting block 106 (FIG. 4) and stored in the checked contents/setting contents storage block 110 in the processing of step S8 (FIGS. 5 and 7) (namely, a sum of the image bit rate and the audio bit rate specified in any one of the first through third settings), for example. Namely, in FIG. 10, the capacity of the DVD format storage area 34-3 in the free area 34-1 of the HDD 34 provides recording capacity Cd of the DVD 14.

Next, the acquisition mode selection block 171 computes capacity Ch2 (hereafter referred to as capture capacity Ch2) in which the recorded data of the digital video tape 13 can be temporarily stored in DV format into the HDD 34 by subtracting computed recording capacity Cd of the DVD 14 from free capacity Ch1 of the HDD 34 checked in step S51. Namely, in FIG. 10, the capacity of the DV format storage enabled area 34-2 in the free area 34-1 of the HDD 34 provides capture capacity Ch2.

If computed capture capacity Ch2 is greater than the data amount of all chapters to be written to the DVD 14 (this data amount is the amount of the recorded data of the digital video tape 13 in DV format to be captured; in this example, this data amount is computed by the acquisition mode selection block 171 itself), then it is determined in step S52 that the data of all chapters to be written to the DVD 14 is stored in the free capacity of the HDD 34.

When the acquisition mode selection block 171 advances its processing to step S53, the batch acquisition block 175 obtains the recorded data of the digital video tape 13 in DV format in a lump (all of the recorded data) from the DV 12 via the i.LINK 45 (FIG. 2) and temporarily stores the acquired data into the DV format storage enabled area 34-2 of the HDD 34 in step S53. When the acquisition processing by the batch acquisition block 175 has been completed, the format conversion block 173 converts the video data of DV format stored in the DV format storage enabled area 34-2 of the HDD 34 from DV format to DVD format and stores the converted video data into the DVD format storage area 34-3 of the HDD 34. The captured data deletion block 174 deletes the video data of DV format from the DV format storage enabled area 34-2 of the HDD 34.

In what follows, the above-mentioned processing of step S53 will be referred to as "automatic acquisition processing". It should be noted that the detail of "automatic acquisition processing" will be described later with reference to the flowcharts shown in FIGS. 17 and 18.

To be more specific, if the acquisition mode selection block 171 determines that the data of all chapters to be written to the DVD can be stored in the free capacity of the HDD in the processing of step S52, then the acquisition mode selection block 171 selects a mode corresponding to "automatic acquisition processing" to be mainly executed by the batch acquisition block 175 as an acquisition mode.

On the other hand, if capture capacity Ch2 (namely, capacity Ch2 of the DV format storage enabled area 34-2 of the HDD 34) is smaller than the data amount of the data (the recorded data of the digital video tape 13 of DV format to be captured) of all chapters to be written to the DVD 14, then it is determined in step S52 that the data of all chapters to be written to the DVD 14 cannot be stored in the free capacity of the HDD 34, upon which the processing operations of steps S54 through S62 will be executed. It should be noted that the processing operations of steps S54 through S62 are referred to as "batch capture processing" against above-mentioned "automatic acquisition processing".

In other words, a first data amount of the content data in the first format (in this example, the data amount of "the data of all chapters to be written to the DVD 14" described in step S52 in FIG. 11, namely the data amount of the recorded data of the digital video tape 13 in DV format (there is a corresponding description herein), for example)) and a second data amount of the content data in the second format (in this example, the data amount of the recorded data of the digital video tape 13 in DVD format, namely the data amount equivalent to the capacity (recording capacity Cd of the DVD 14) of the DVD format storage area 34-3 in the free area 34-1 of the HDD 34 shown in FIG. 10, for example) are computed, the computed first data amount and the computed second data amount are added together to compute a first threshold value, and it is determined in step S52 whether the free capacity of the HDD (in this example, capacity Ch1 of the free area 34-1 of the HDD 34 shown in FIG. 10 for example) is smaller than the computed first threshold value, thereby determining whether the data of all chapters to be written to the DVD can be stored in the free capacity of the HDD.

Namely, if the data of all chapters to be written to the DVD is found unable to be stored in the free capacity of the HDD in step S52, then the acquisition mode selection block 171 selects a mode corresponding to "batch capture processing" to be mainly executed by the piecemeal acquisition block 172, as an acquisition mode.

To be more specific, when "batch capture processing" is selected, the piecemeal acquisition block 172 computes a maximum data amount to be captured in a lump (hereafter referred to simply as a maximum data amount) in accordance with the free capacity of the HDD 34 (capture capacity Ch2 of the DV format storage enabled area 34-2) in step S54. Namely, the maximum data amount is set below capture amount Ch2 of the DV format storage enabled area 34-2.

Next, in step S55, the piecemeal acquisition block 172 determines whether there is any chapter that has a data amount greater than the maximum data amount computed in step S54 among the chapters (namely all chapters forming the recorded data of the digital video tape 13) listed in the chapter list checked by the check block 104 (FIG. 4) and stored in the checked contents/setting contents storage block 110 (FIG. 4) in step S7 (FIG. 5).

If a chapter having a data amount greater than the maximum data amount is found in step S55, then the piecemeal acquisition block 172 divides the chapter having a data amount greater than the maximum data amount into a plurality of sections each having a data amount smaller than the maximum data amount in step S56.

Figure 12:
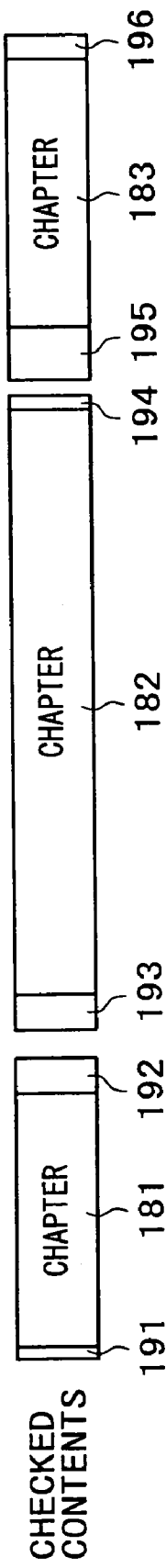
FIG. 12 is a diagram illustrating specific exemplary processing of a divided acquisition block of the acquisition block shown in FIG. 10.

To be more specific, it is supposed that the processing of step S7 (FIG. 5) found that a part of the recording contents of the digital video tape 13 is formed by a chapter 181 having a data amount smaller than the maximum data amount, a chapter 182 having a data amount greater than the maximum data amount, and a chapter 183 having a data mount smaller than the maximum data amount, as it shows in FIG. 12 for example. In other words, it is supposed that the chapters 181 through 183 be included in the chapter list stored in the checked contents/setting contents storage block 110 (FIG. 4). It should be noted that data 191 through data 196 are unrecognized data.

In this case, the chapter 182 having a data amount greater than the maximum data amount is found in step S55 (FIG. 11). In step S56 (FIG. 11), the chapter 182 having a data amount greater than the maximum data amount is divided into a section 182-1 and a section 182-2 each having a predetermined data amount smaller than the maximum data amount as shown in FIG. 13.

In this case, the chapter list stored in the checked contents/setting contents storage block 110 (FIG. 4) is also updated. Namely, the chapter information of the chapter 182 is deleted and the section information (namely, the information corresponding to the chapter information) of the section 182-1 and the section 182-2 is added to the position from which the chapter information of the chapter 182 has been deleted.

Because unrecognized data 193 exits before the section 182-1 at this moment, the above-mentioned ambiguous flag is attached to the start frame of the section 182-1 (the ambiguous flag attached to the start frame of the chapter 182 before being divided is left as it is); but there is no unrecognized data after the section 182-1 (namely, the last frame of the section 182-1 is continuous to the start frame of the section 182-2), so that no ambiguous flag is attached to the last frame of the section 182-1. Likewise, no ambiguous flag is attached to the start frame of the section 182-2, but the ambiguous flag is attached to the last frame of the section 182-2 (the ambiguous flag attached to the last frame of the chapter 182 before being divided is left as it is).

Figure 13:
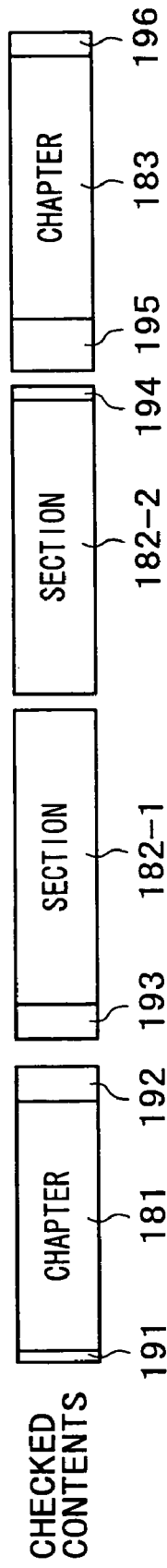
FIG. 13 is a diagram illustrating specific exemplary processing of the divided acquisition block of the acquisition block shown in FIG. 10.

It should be noted that, in the example shown in FIG. 13, one chapter is divided into two sections; however, the number of sections obtained from one chapter is not limited to any particular value as long as their data amounts are smaller than the maximum data amount computed in step S54.

On the other hand, if no chapter having a data amount greater than the maximum data amount is found in step S55 shown in FIG. 11, then the processing goes to step S57 skipping step S56.

If no chapter having a data amount greater than the maximum data amount is found in step S55 or if the processing of step S56 has been ended, then, in step S57, the piecemeal acquisition block 172 shown in FIG. 10 obtains the data of a chapter to be acquired next or the data of a section to be acquired next from the DV 12 through the i.LINK 45 (FIG. 2) on the basis of the chapter list stored in the checked contents/setting contents storage block 110 (FIG. 4) and stores the acquired data into the DV format storage enabled area 34-2 of the HDD 34.

To be more specific, it is supposed that the piecemeal acquisition block 172 recognize a chapter formed by frames 53 through 68 as a chapter to be acquired next, for example. It is also supposed that the recorded contents of the digital video tape 13 for the recognized chapter be a section 201 formed by frames 50 through 70 as shown in FIG. 14, for example.

In this case, data 201-1 and data 201-3 of the section 201 are unrecognized data, so that the start frame (having frame number 53) and the end frame (having frame number 68) recognized by the check block 104 (FIG. 4) are each attached with an ambiguous flag.

Therefore, upon detection of the ambiguous flag of the start frame, the piecemeal acquisition block 172 requests the DV control block 103 (FIG. 4) to execute rewind reproduction (for example, −1 times speed reproduction). In response to this request, the DV control block 103 generates a control signal directing "rewind reproduction" and transmits the control signal to the DV 12 via the i.LINK 45 (FIG. 2), thereby controlling the DV 12 to execute the rewind reproduction of the digital video tape 13.

Figure 14:
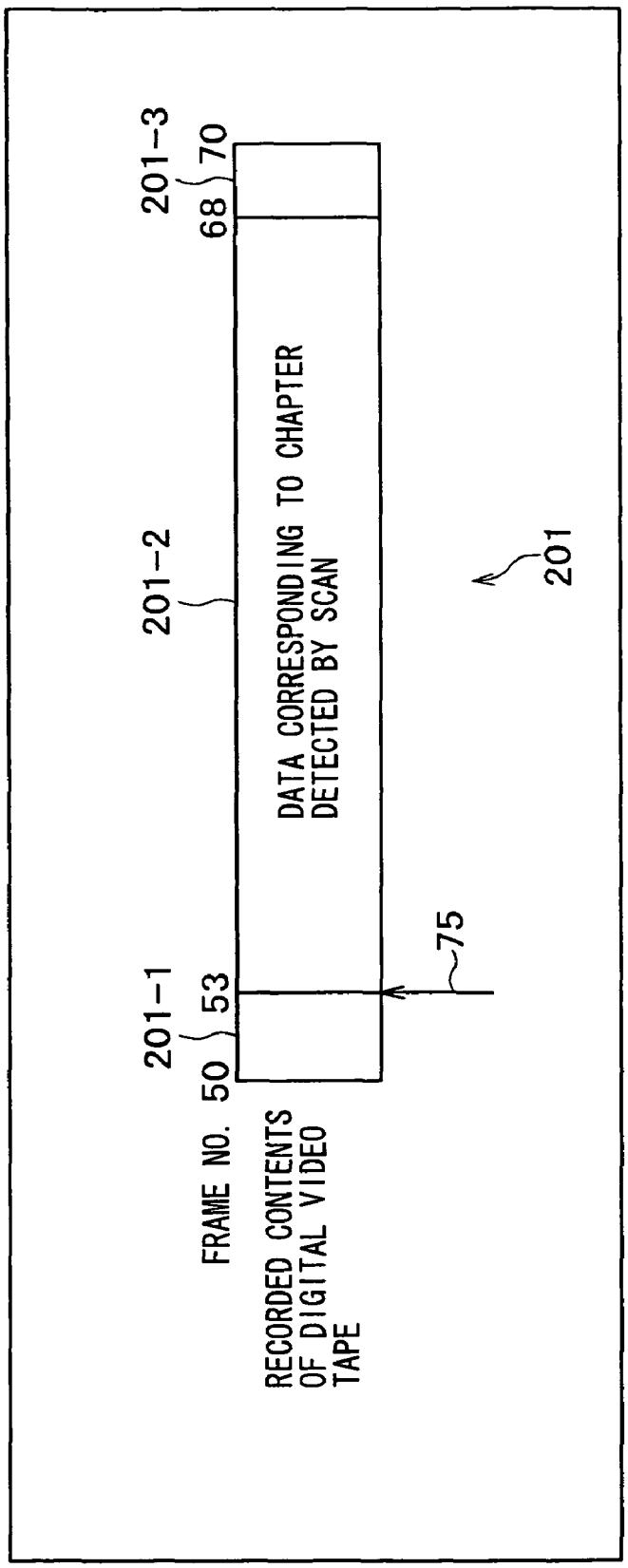
FIG. 14 is a diagram illustrating specific exemplary processing of the divided acquisition block of the acquisition block shown in FIG. 10.
Figure 15:
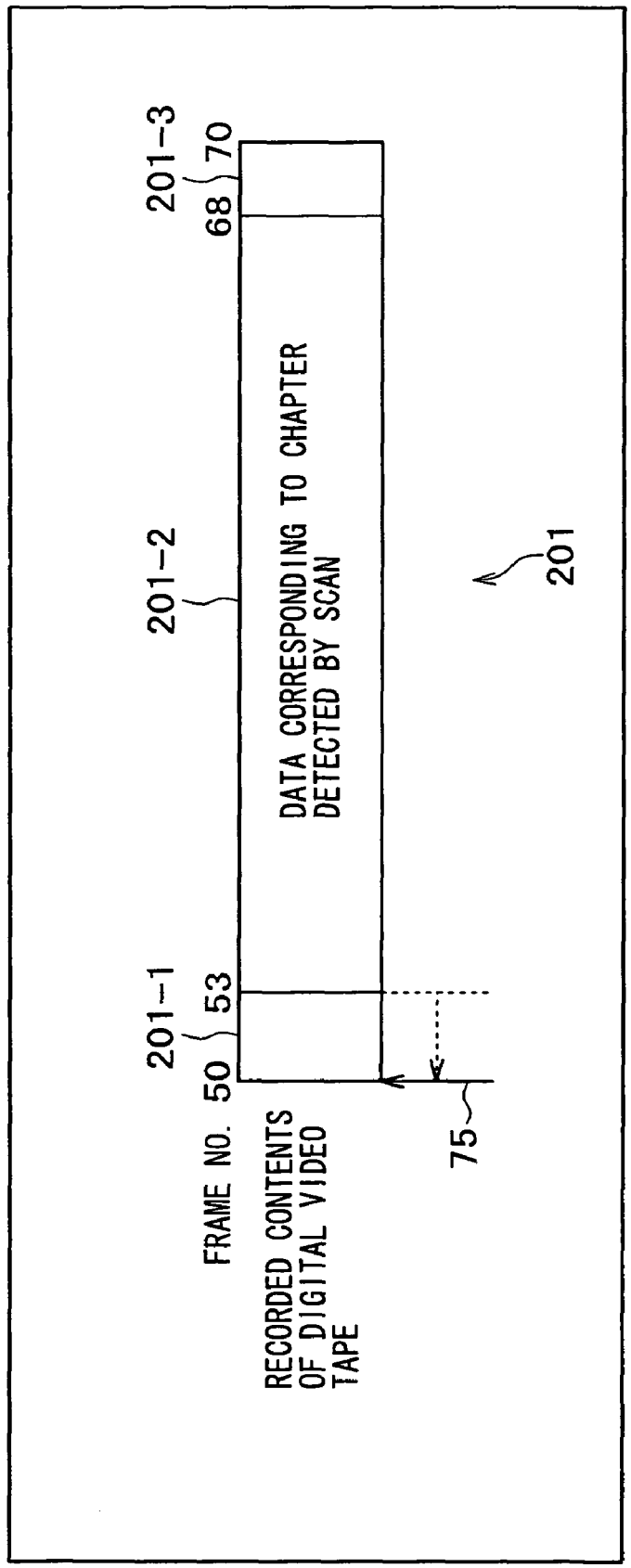
FIG. 15 is a diagram illustrating specific exemplary processing of the divided acquisition block of the acquisition block shown in FIG. 10.

When the rewind reproduction of the digital video tape 13 has been executed (when the head 75 (FIG. 3) of the DV 12 has relatively moved from the position shown in FIG. 14 to the position indicated by dashed arrow shown in FIG. 15), the reproduced video signals corresponding to the frames of frame numbers which are turned back one by one from frame number 53 are sequentially transmitted from the DV 12.

So, the piecemeal acquisition block 172 obtains these reproduced video signals via the i.LINK 45 (FIG. 2) to check each frame for recording start point information. Upon detection of recording start point information, the piecemeal acquisition block 172 updates the frame including the detected recording start point information (in this case (in the example shown in FIG. 15), the frame of frame number 50) to the start frame of a chapter to be acquired next (namely, updates the chapter list stored in the checked contents/setting contents storage block 110).

Next, the piecemeal acquisition block 172 requests the DV control block 103 (FIG. 4) to reproduce the digital video tape 13 from the updated start frame (having number 50) at normal speed. In response to this request, the DV control block 103 generates a control signal for directing "normal speed (times 1) reproduction" and transmits the control signal to the DV 12 via the i.LINK 45 (FIG. 2), thereby making the DV 12 execute the normal speed reproduction of the digital video tape 13.

Figure 16:
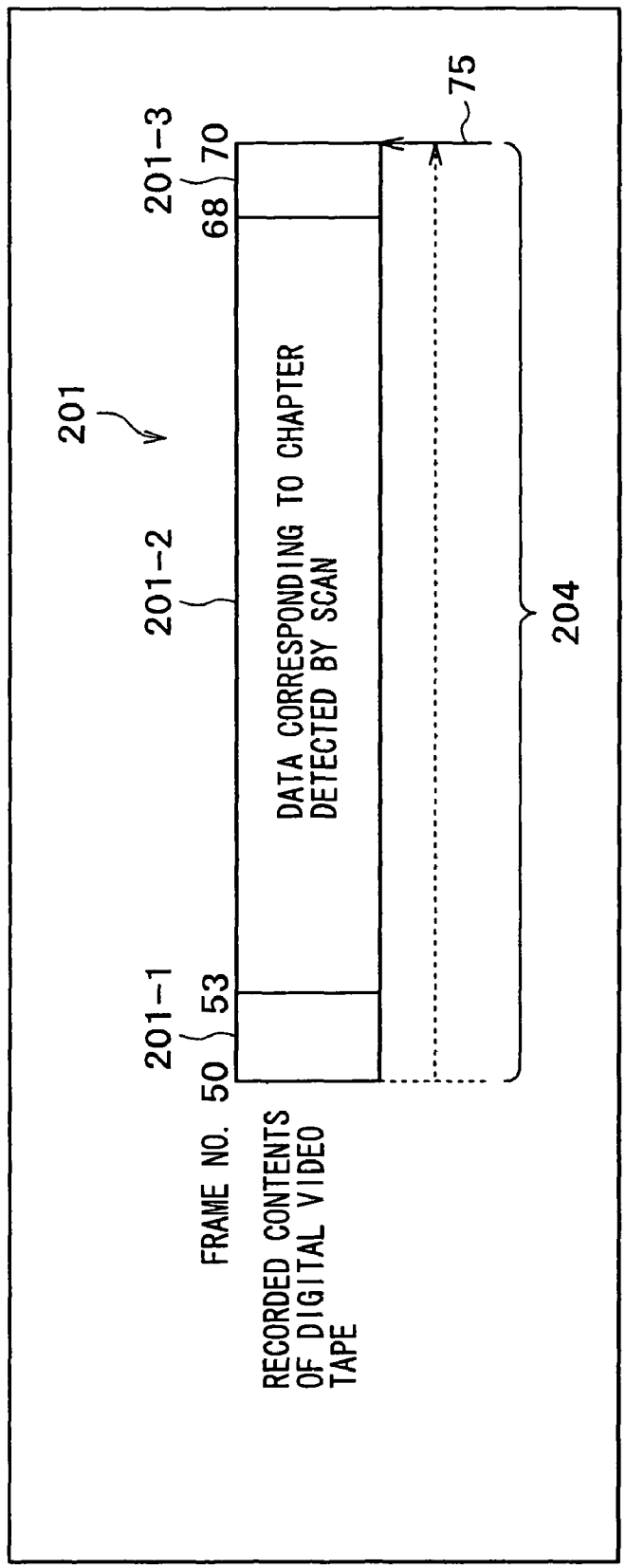
FIG. 16 is a diagram illustrating specific exemplary processing of the divided acquisition block of the acquisition block shown in FIG. 10.

When the digital video tape 13 has been reproduced at normal speed (when the head 75 (FIG. 3) of the DV 12 has relatively moved to the position indicated by dashed arrow shown in FIG. 16), reproduced video signals corresponding to the frames having numbers from 50 (actually, a frame number several frames before frame 50) to subsequent frames one by one, are transmitted from the DV 12.

So, the piecemeal acquisition block 172 starts acquiring the reproduced video signals via the i.LINK 45 (FIG. 2), thereby starting, in this case (namely, in the example shown in FIG. 16), the processing of storing the video data starting with the frame of frame number 50 into the DV format storage enabled area 34-2 of the HDD 34. Upon detection of an ambiguous flag (in this case, in the example shown in FIG. 16, upon detection of the frame having frame number 68), the piecemeal acquisition block 172 stores the frames inclusive of the frame having the next recording end point information (the frame immediately before the frame having recording start point information, namely the frame having frame number 70 in this case (namely, in the example shown in FIG. 16)) into the DV format storage enabled area 34-2 of the HDD 34, stops its acquisition processing, and requests the DV control block 103 (FIG. 4) to stop the normal speed reproduction. In response to this request, the DV control block 103 generates a control signal for directing "stop" and transmits this control signal to the DV 12 via the i.LINK 45 (FIG. 2), thereby making the DV 12 stop the normal speed reproduction of the digital video tape 13.

It should be noted that, if no ambiguous flag is found, the above-mentioned rewind processing and so on are not executed; instead, the start frame through the end frame included in the chapter list are reproduced and stored in the PC 11.

Thus, the piecemeal acquisition block 172 can acquire all the recorded contents of the digital video tape 13 from the DV 12 by the above-mentioned method (the method shown in FIGS. 14 through 16).

Namely, for example, if the piecemeal acquisition block 172 simply attempts to acquire the data of the section 201 shown in FIG. 16 that is the actual recorded contents of the digital video tape 13 as the chapter data on the basis of the chapter list stored in the checked contents/setting contents storage block 110 (FIG. 4), the piecemeal acquisition block 172 can acquire only the data 201-2 corresponding to the chapter detected by scan processing of step S7 (FIG. 5) of the section 201 (cannot acquire unrecognized data 201-1 and unrecognized dada 201-3) because only data 201-2 was detected by this scan processing.

On the other hand, the piecemeal acquisition block 172 of this example executes the data acquisition processing by use of the above-mentioned method (shown in FIGS. 14 through 16), so that the piecemeal acquisition block 172 can surely acquire the all data of the section 201 as data 204 of the chapter.

Meanwhile, the chapter data stored in the DV format storage enabled area 34-2 of the HDD 34 is in DV format. In DV format, one frame is equal to 120000 bytes and the frame rate is 29.97 frames/second, so that a data amount for one second of the digital video tape 13 is 3596400 bytes/second (=120000 bytes/frame*29.97 frames/second), which is as large as 215784000 bytes (or 215.79 MB) in minute equivalent.

On the other hand, in DVD format, namely MPEG-2 format in this example, the image bit rate is a maximum of 8 Mbps (maximum first value set by the bit rate setting block 106 (FIG. 4) as described above, so that the data amount for one minute is 60 MB at a maximum, namely about less than $\frac{1}{3.4}$ of DV format.

Therefore, in step S58 shown in FIG. 11, the format conversion block 173 converts the data having DV format (the data of chapter or the data of section) acquired by the piecemeal acquisition block 172 in step S57 and stored in the DV format storage enabled area 34-2 of the HDD 34 into the data having DVD format and stores the converted data into the DVD format storage area 34-3 of the HDD 34. Next, in step S59, the captured data deletion block 174 deletes the data having DV format (namely, the data having DV format corresponding to the data having DVD format stored in the DVD format storage area 34-3 of the HDD 34 by the format conversion block 173 in step S58) acquired by the piecemeal acquisition block 172 in step S57 and stored in the DV format storage enabled area 34-2 of the HDD 34.

In step S60, the format conversion block 173 determines whether the data converted in step S58 into DVD format and stored in the DVD format storage area 34-3 of the HDD 34 includes the recording end point (information).

Namely, if the video data stored in the DVD format storage area 34-3 of the HDD 34 in step S58 is the data of other than the last section of the sections provided in step S56, it indicates that this video data has no frame that includes recording end point information, so that the stored data is found not including a recording end point in step S60, upon which the processing goes to step S62.

On the other hand, if the video data stored in the DVD format storage area 34-3 of the HDD 34 in step S58 is found to be the data of the last section of the sections provided in step S56 or the data of the chapter not divided into sections, then it is determined in step S60 that the a recording end point is included in the stored data, upon which the format conversion block 173 sets the chapter in step S61.

To be more specific, if the video data stored in the DVD format storage area 34-3 of the HDD 34 is found to be the data of the last section of the sections obtained in step S56, then the format conversion block 173 combines the other sections stored in the DVD format storage area 34-3 of the HDD 34 with that last section, stores the combined sections into the DVD format storage area 34-3 of the HDD 34 (or writes these sections over those stored therein) as the chapter data, and updates the chapter list stored in the checked contents/setting contents storage block 110 (FIG. 4).

If the data stored in the DVD format storage area 34-3 of the HDD 34 is found to be the data of a chapter not divided, then the format conversion block 173 simply updates the chapter list stored in the checked contents/setting contents storage block 110 (FIG. 4). For example, if the data stored in the DVD format storage area 34-3 of the HDD 34 is data 204 of the chapter shown in FIG. 16, the frame number of the start frame in the chapter list has been updated from 53 to 50 in step S57 as described above. However, because the frame number of the last frame in the chapter list is still 68, it is updated to 70 in step S61.

Referring to FIG. 11 again, if the stored data is found not including a recording end point or the processing of step S61 has ended, the piecemeal acquisition block 172 determines in step S62 whether the data of all chapters to be written to the DVD 14 (namely, the data of all chapters included in the chapter list) have been acquired from the DV 12.

If the data of all chapters to be written to the DVD 14 are found not acquired from the DV 12 in step S62, the processing returns to step S57 to repeat itself therefrom. Thai is, the data of a chapter to be acquired next or the data of a section to be acquired next is captured in DV format, the captured data is stored in the DV format storage enabled area 34-2 of the HDD 34, the stored data is converted from DV format to DVD format, the converted data is stored in the DVD format storage area 34-3 of the HDD 34, and the data having DV format stored in the DV format storage enabled area 34-2 of the HDD 34 is deleted.

Then, when the data of the last chapter has been stored in the DVD format storage area 34-3 of the HDD 34 by repeating the above-mentioned processing operations of steps S57 through S62, it is determined that the data of all chapters to be written to the DVD 14 have been acquired from the DV 12, upon which this processing comes to an end.

As described above, because the acquisition block 105 (FIGS. 4 and 10) can execute "batch capture processing" of "digital video tape recorded data acquisition processing", the following advantages are provided.

Namely, the following two methods are known for capturing video data from the digital video tape 13 loaded on the DV 12 into the PC and so on.

In the first method, the user operates the DV 12 to move the digital video tape 13 to a capture start position desired by the user, and the data is captured from the digital video tape 13 into the PC, upon which the reproduction of the digital video tape 13 is started by the DV 12, followed by the stop of the capture processing upon capturing of the necessary portion of the digital video tape 13, thereby executing the processing of stopping the digital video tape 13.

In the second method, the user operates the DV 12 to move the digital video tape 13 to a capture start position desired by the user, this capture start position is registered in the PC, the user operates the DV 12 again to move the digital video tape 13 to a capture stop position, and this capture stop position is registered in the PC, thereby executing the capture processing.

However, with the first method, the user must manually divide a range of video data to be captured while checking the free capacity of an auxiliary storage unit (the HDD of the PC for example) during data capture processing and therefore it is difficult for the user to determine the range (or length) in which to divide the video data. In addition, with the first method, it is very difficult to control the connection between the sections of video data obtained by dividing the video data. Even if control is executed over the connection between the sections of video data, the sections of video data combined by this connection prevent problems of overlapping and dropping of data.

The second method is easier than the first method in control of the connection between the sections. However, it is also difficult with the second method to set the range (or length) in which to divide video data into sections. In addition, the specification of the division of video data at every division point is a time-consuming job.

In contrast, the PC 11 (FIG. 2) according to the invention can execute "batch capture processing" as one of the functions of the data acquisition/DVD write block 91 (FIG. 4).

To be more specific, if it is impossible to acquire the data (namely, the recorded data of the digital video tape 13) to be written to the DVD 14 in a lump, subsequent processing is automatically executed to automatically capture the recorded data of the digital video tape 13 into the PC 11 without a special user intervention (namely, the user may only connect the DV 12 to the PC 11 and turns on the power to the DV 12).

In other words, an information processing apparatus for capturing content data recorded in a first format, comprising: storage means for storing content data; computation means for computing a free capacity of the storage means; acquisition means for dividing the content data into a plurality of data sections on the basis of the free capacity of the storage means computed by the computation means, acquiring a predetermined first data section among the plurality of data sections, and storing the acquired predetermined first data section into the storage means; conversion means for converting the format of the first data section acquired by the acquisition means from the first format to a second format, generating a second data section smaller in data amount than the first data section, and storing the generated second data section into the storage means; and delating means for deleting, when the generated second data section obtained by converting the format of the first data section by the conversion means has been stored in the storage means, the first data section from the storage means before a third data section different from the first data section is acquired by the acquisition means from among the plurality of data sections forming the content data.

Namely, the recorded data of the digital video tape 13 is divided into a plurality of data sections (or a plurality of chapter data or section data), these data sections are sequentially acquired, the acquired data sections are temporarily stored in the DV format storage enabled area 34-2 of the HDD 34, the format of the stored data sections is converted to DVD format, the converted data sections are stored in the DVD format storage area 34-3 of the HDD 34, and then the data sections having DV format are deleted from the DV format storage enabled area 34-2 of the HDD 34.

Thus, if the free capacity of the HDD 34 is small and it is therefore impossible to capture the recorded data of the digital video tape 13 (namely, the data to be written to the DVD 14) cannot be captured in a lump, all the recorded data of the digital video tape 13 can be eventually captured. That is, the user can capture all of the data recorded to the digital video tape 13 into the PC 11 without drop and in a short time without having to worry about the free capacity of the auxiliary storage unit (namely, the HDD 34). In addition, if such "batch capture processing" is executed, no such errors as a duplicate capture of a part of the data and a drop of data will occur, thereby providing the secure and correct capture of all the data recorded to the digital video tape 13.

Consequently, the execution of "batch capture processing" by the acquisition block 105 solves the above-mentioned problems involved in related-art technologies in capturing the recorded data of the digital video tape 13 from the DV 12 into the PC and so on.

In the above, "batch capture processing (the processing of steps S54 through S62) of the "digital video tape recorded data acquisition processing" has been described with reference to the flowchart shown in FIG. 11. The following describes "automatic acquisition processing" of "digital video tape recorded data acquisition processing".

As described above, if the data of all chapters to be written to the DVD 14 are found able to be stored in the free capacity of the HDD 34 in step S52, then "automatic acquisition processing" is executed in step S53.

Figure 17:
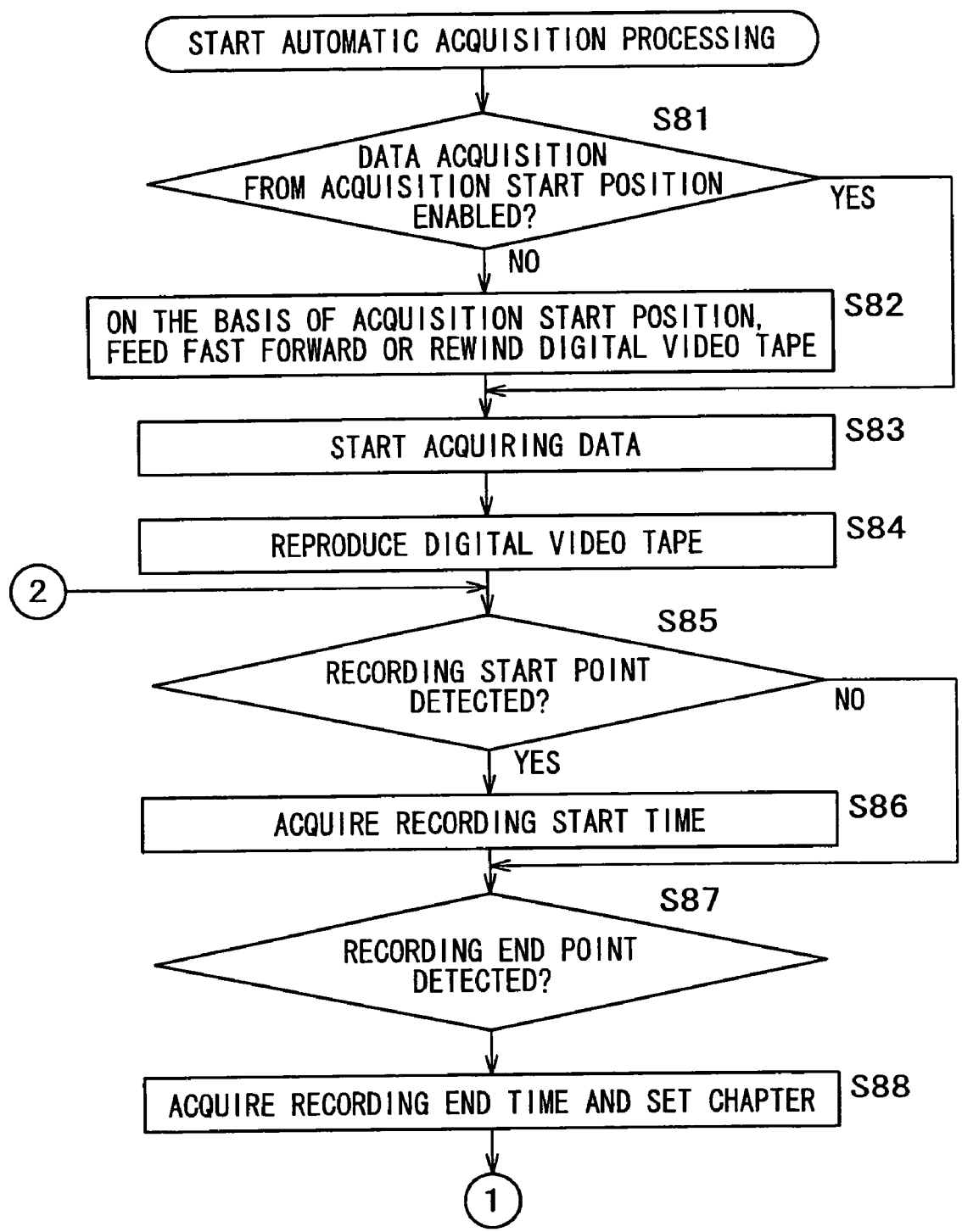
FIG. 17 is a flowchart indicative of exemplary details of automatic acquisition processing of the acquisition processing for acquiring recorded data of digital video tape shown in FIG. 11.
Figure 18:
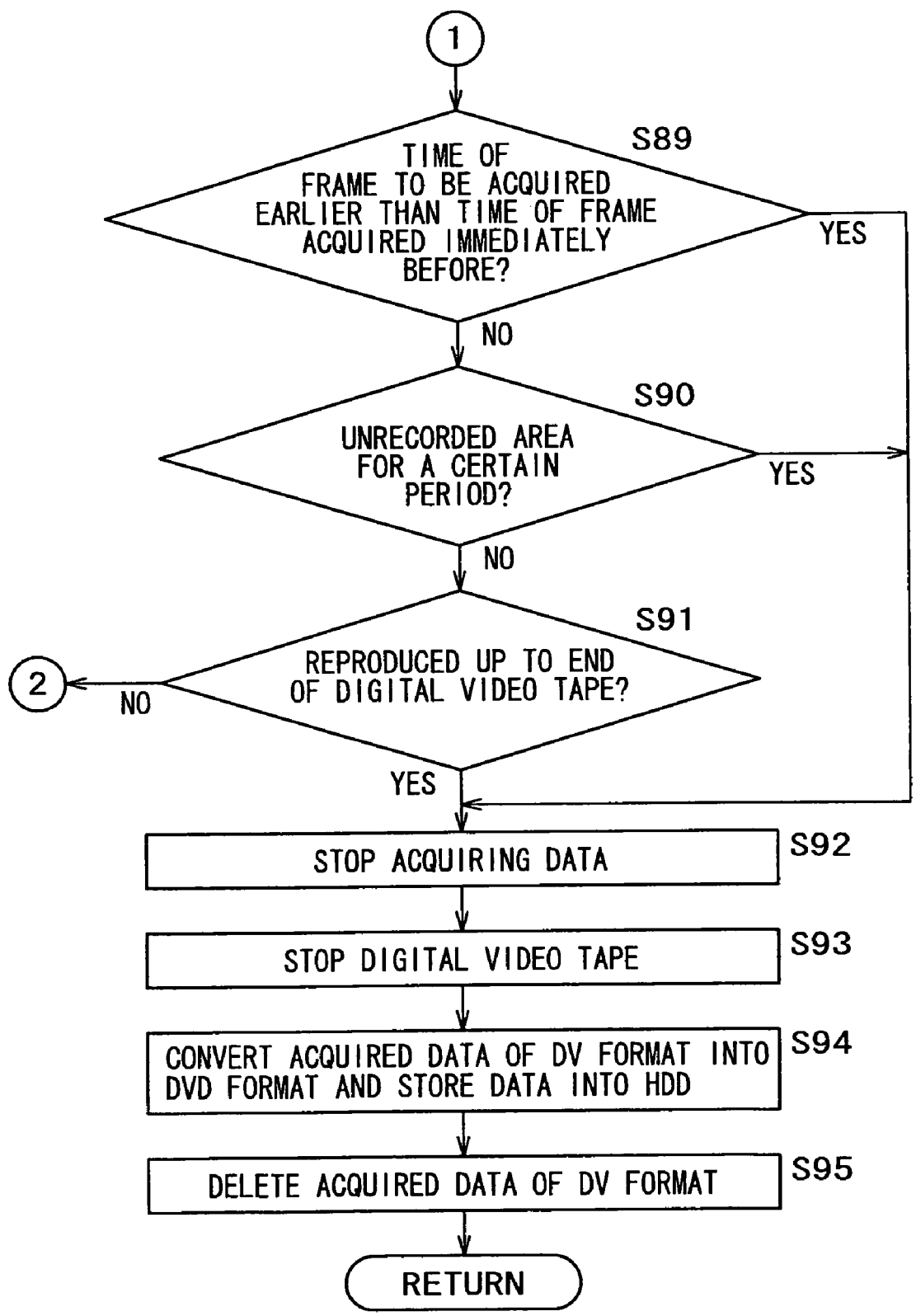
FIG. 18 is another flowchart indicative of exemplary details of automatic acquisition processing of the acquisition processing for acquiring recorded data of digital video tape shown in FIG. 11.

The details of "automatic acquisition processing" in this example are shown in the flowcharts of FIGS. 17 and 18. The following describes the details of "automatic acquisition processing" in this example with reference to the flowcharts of FIGS. 17 and 18.

First, in step S81 shown in FIG. 17, the batch acquisition block 175 shown in FIG. 10 determines whether or not the acquisition of data from the capture start position (namely, the start frame of the start chapter in the chapter list stored in the checked contents/setting contents storage block 110) can be made. Namely, the batch acquisition block 175 determines whether or not the current position of the digital video tape 13 loaded on the DV 12 matches the capture start position (actually, a position slightly before the capture start position).

If the acquisition of data from the capture start position is found impossible (or not possible) in step S81, then the batch acquisition block 175 feeds fast forward or rewinds the digital video tape 13 in step S82 on the basis of the capture start position.

Namely, if the current position of the digital video tape 13 is before the capture start position, the batch acquisition block 175 requests the DV control block 103 (FIG. 4) to fast forward feed the digital video tape 13 and, if the current position is after the capture start position, the batch acquisition block 175 requests the DV control block 103 to rewind the digital video tape 13. In response to this request, the DV control block 103 generates a control signal directing "fast forward" or "rewind" and transmits the generated control signal to the DV 12 via the i.LINK 45 (FIG. 2), thereby controlling the DV 12 to fast forward feed or rewind the digital video tape 13.

To be more specific, in capturing the recorded data recorded from the start of the digital video tape 13, the batch acquisition block 175 requests the DV control block 103 to rewind the digital video tape 13 to its start position. In response to this request, the DV control block 103 generates a control signal for directing "rewind" and transmits the generated control signal to the DV 12 via the i.LINK 45, thereby controlling the DV 12 to rewind the digital video tape 13.

Next, upon detection that the digital video tape 13 has been rewound to its start position, the batch acquisition block 175 starts data capture in step S83. In step S84, the digital video tape 13 is reproduced.

To be more specific, the batch acquisition block 175 requests the DV control block 103 (FIG. 4) for the reproduction at normal speed. In response to this request, the DV control block 103 generates a control signal for directing "normal speed reproduction" and transmits the control signal to the DV 12 via the i.LINK 45 (FIG. 2), thereby controlling the DV 12 to reproduce the digital video tape 13 at normal speed. When the normal speed reproduction of the digital video tape 13 gets started, reproduced video data (namely, reproduced video signals) are sequentially transmitted, the video data corresponding to the capture start position first.

So, the batch acquisition block 175 sequentially acquires the video data via the i.LINK 45 (FIG. 2) and stores the acquired video data into the DV format storage enabled area 34-2 of the HDD 34.

In step S85, the batch acquisition block 175 determines whether the recording start point has been detected or not.

If the recording start point is found detected in step S85, namely, if the frame having recording start point information has been acquired, then the batch acquisition block 175 gets a recording start time (namely, the video taking time information (year, month, day, hour, minute, and second)) information included in that frame) in step S86.

If no recording start point is found detected (or if the recording start time is found not detected) in step S85 or if the processing of step S86 has ended, the batch acquisition block 175 determines in step S87 whether a recording end point has been detected or not.

If the recording end point is found detected in step S87, namely, if the frame having recording end point information has been acquired, then the batch acquisition block 175 gets a recording end time (namely, the video taking time information (year, month, day, hour, minute, and second)) information included in that frame) in step S88, thereby setting the chapter.

Namely, as described above, the chapter included in the chapter list stored in the checked contents/setting contents storage block 110 (FIG. 4) is formed only the frames scanned by the fast forward reproduction in step S7 (FIG. 5) among all frames included in the recorded data of the digital video tape 13 (refer to FIG. 6 for example). Therefore, in the processing operations of steps S85 through S88, the batch acquisition block 175 detects the actual recording start point and the recording end point that appears next, sets the sections between these points as a chapter, and generates the chapter information including the recording start time and recording end time of that chapter, thereby updating the chapter list stored in the checked contents/setting contents storage block 110 (FIG. 4).

In step S89 shown in FIG. 18, the overwrite recording monitor block 176 determines whether or not the time of the frame acquired just now by the batch acquisition block 175 (namely, the video taking time information (year, month, day, hour, minute, and second) included in the first frame just reproduced by the DV 12) is earlier than the time of the frame acquired immediately before (namely, the video taking time information (year, month, day, hour, minute, and second) included in the second frame reproduced by the DV 12 immediately before the first frame).

If the time of the frame acquired just now by the batch acquisition block 175 is earlier than the time of the frame acquired immediately before, it indicates that the first video data formed by the frames subsequent to the frame acquired just now and the second video data formed by the frames preceding the frame immediately before are not directly related with each other, but the first video data precedes the second video data in time. Namely, it indicates that the second data (namely, the video data to be acquired this time) has been newly written over the first video data already recorded.

Therefore, if, in step S89, the time of the frame acquired just now is found by the batch acquisition block 175 to be earlier than the time of the frame acquired immediately before, the batch acquisition block 175 determines that the reproduction of the second video data (namely, the target data of the acquisition processing) acquired so far had ended, thereby directing the batch acquisition block 175 to stop its acquisition processing.

In response to this direction, the batch acquisition block 175 stops acquiring the data in step S92 and stops the digital video tape 13 in step S93.

Namely, the batch acquisition block 175 requests the DV control block 103 (FIG. 4) to stop normal-speed reproduction. In response to this request, the DV control block 103 generates a control signal for directing "stop" and transmits the control signal to the DV 12 via the i.LINK 45 (FIG. 2), thereby controlling the DV 12 to stop the digital video tape 13.

Thus, the processing by the overwrite recording monitor block 176 allows the acquisition block 105 to securely acquire only the second video data also from the digital video tape 13 written with the second video data to be acquired this time over the first video data recorded in the past.

On the other hand, if the batch acquisition block 175 determines that the time of the frame acquired just now is not earlier than the time of the frame acquired immediately before, then the overwrite recording monitor block 176 determines that the second video tape acquired so far (namely, the target of acquisition) has not yet ended. Then, the unrecorded area monitor block 177 determines in step S90 whether an unrecorded area continues for a certain period of time.

Namely, if an unrecorded area has continued for a certain period of time (namely, if an unrecorded area is found continuing for a certain period of time in step S90), then the unrecorded area monitor block 177 regards that the second video data acquired so far (namely, the target of acquisition) is not recorded in the subsequent portions (regards that the reproduction of the second video data has ended), thereby directing the batch acquisition block 175 to stop its acquisition processing.

In response to the stop specification, the batch acquisition block 175 stops the data acquisition in step S92 and stops the digital video tape 13 in step S93.

Thus, the processing by the unrecorded area monitor block 177 allows the acquisition block 105 to surely acquire only the second video data that is the target of acquisition this time without reproducing the digital video tape 13 to its end, even if the second video data is not recorded up to the tape end. Consequently, this configuration can shorten the capture time.

On the other hand, if an unrecorded area is found not continuing for a certain period of time in step S90, then the unrecorded area monitor block 177 determines that the second video data (namely, the target of acquisition) captured so far has not ended. Then, the tape end monitor block 178 determines in step S91 whether or not the second video data has been reproduced to the end of the digital video tape 13.

If the second video data is found not reproduced to the end of the digital video tape 13 in sep S91, then the processing returns to step S85 (FIG. 17) to repeat the itself therefrom. Namely, the data acquisition processing by the batch acquisition block 175 is continued until it is determined that the second video data (namely, the target of acquisition) acquired so far ends.

On the other hand, if the second video data is found reproduced up to the end of the digital video tape 13, then the batch acquisition block 175 is directed to stop its acquisition processing.

In response to this stop specification, the batch acquisition block 175 stops the data acquisition in step S92 and stops the digital video tape 13 in step S93.

Thus, when the data acquisition processing by the batch acquisition block 175 has been completed (namely, when the processing of step S93 comes to an end), the format conversion block 173 converts, in step S94, the format of the video data having DV format acquired by the batch acquisition block 175 and stored in the DV format storage enabled area 34-2 into DVD format (in this example, MPEG-2 format) and stores the converted video data into the DVD format storage area 34-3. In step S95, the captured data deletion block 174 deletes the data having DV format acquired by the batch acquisition block 175 and stored in the DV format storage enabled area 34-2, thereby returning its processing.

As described above, because the acquisition block 105 can execute "automatic acquisition processing" of "digital video tape recorded data acquisition processing", the following advantages are attained.

Namely, as described with respect to the advantages of "batch capture processing", the following two methods are known in which video data is captured from the digital video tape 13 loaded on the DV 12 into the PC and so on.

In the first method, the user operates the DV 12 to move the digital video tape 13 to a capture start position desired by the user, and the data is captured from the digital video tape 13 into the PC, upon which the reproduction of the digital video tape 13 is started by the DV 12, followed by the stop of the capture processing upon capturing of the necessary portion of the digital video tape 13, thereby executing the processing of stopping the digital video tape 13.

In the second method, the user operates the DV 12 to move the digital video tape 13 to a capture start position desired by the user, this capture start position is registered in the PC, the user operates the DV 12 again to move the digital video tape 13 to a capture stop position, and this capture stop position is registered in the PC, thereby executing the capture processing.

However, the first method involves a problem that the user must manually operate the DV 12 to execute rewind, stop, and reproduction of the digital video tape 13, so that, while the data recorded to the digital video tape 13 is being captured into the PC, the user must monitor the video being captured.

Obviously, the user can capture video data from the digital video tape 13 into the PC until the tape end is reached without monitoring. In this case, however, if the second video data to be captured this time is written over the first video data recorded in the past on the digital video tape 13, problems occur that not only the second video data desired by the user but also the first video data not desired by the user (namely, the video data unnecessary for the user) are captured from the digital video tape 13 and, in the case of a digital video tape not recorded up to its end, an unrecorded area (namely, an area having no data) is also captured, thereby making the capture time longer than necessary.

The second method also involves a problem that moving the digital video tape 13 to capture start position or end position and its confirmation and registration require user manual operations (namely, the user must manually operate the DV 12), consequently taking much time.

In contrast, the PC 11 (FIGS. 1 and 2) according to the invention can execute "automatic acquisition processing" as one of the functions of the data acquisition/DVD write block 91 (FIG. 4). Namely, even if the data recorded to the digital video tape 13 is in any state, only the video data desired by the user can be automatically captured and, when the capture has been completed, the capture processing itself is automatically stopped without any special user intervention (namely, by simply connecting the DV 12 to the PC 11 and tuning on the power to the DV 12).

In other words, the PC 11 comprises: acquisition means for acquiring predetermined content data formed by a plurality of frames to be reproduced by a predetermined reproduction device; and acquisition stop control means for monitoring a recording time at which each of the plurality of frames was recorded in the time information included in each frame to be reproduced by the reproduction device and, if the recording time of a first frame monitored this time is earlier than the recording time of a second frame monitored before the first frame, executing control so as to stop the acquisition of the content data by the acquisition means.

Namely, even if the second video data to be captured this time is written over the first video data (namely, the video data not desired by the user) recorded in the past, only the second video data which is the target of acquisition can be surely captured without capturing the past first video data.

The PC 11 also includes: acquisition means for acquiring predetermined content data to be reproduced by a predetermined reproduction device; and acquisition stop control means for monitoring the contents of the reproduction executed by the reproduction device and, if recorded data of the content data is not reproduced for more than a predetermined period of time, executing control so as to stop the acquisition of the content data by the acquisition means.

Thus, by executing "automatic acquisition processing", the acquisition block 105 provides an advantage of solving the above-mentioned problems involved in the related-art configuration for capturing the recorded data of the digital video tape 13 from the DV 12 into the PC and so on.

It should be noted that, also in "batch capture processing", insertion of steps S89 through S91 shown in FIG. 18 in place of step S62 shown in FIG. 11 brings out the same advantages as those of "automatic acquisition processing" described above. In this case, if any of the processing operations of steps S89 through S91 is determined YES, then the processing is returned. If the decision is NO in step S91, the processing returns to step S57 to repeat itself therefrom. In other words, as indicated with a dashed arrow shown in FIG. 10, each of the overwrite recording monitor block 176, the unrecorded area monitor block 177, and tape end monitor block 178 can output a stop direction not only to the batch acquisition block 175 but also to the piecemeal acquisition block 172.

Figure 19:
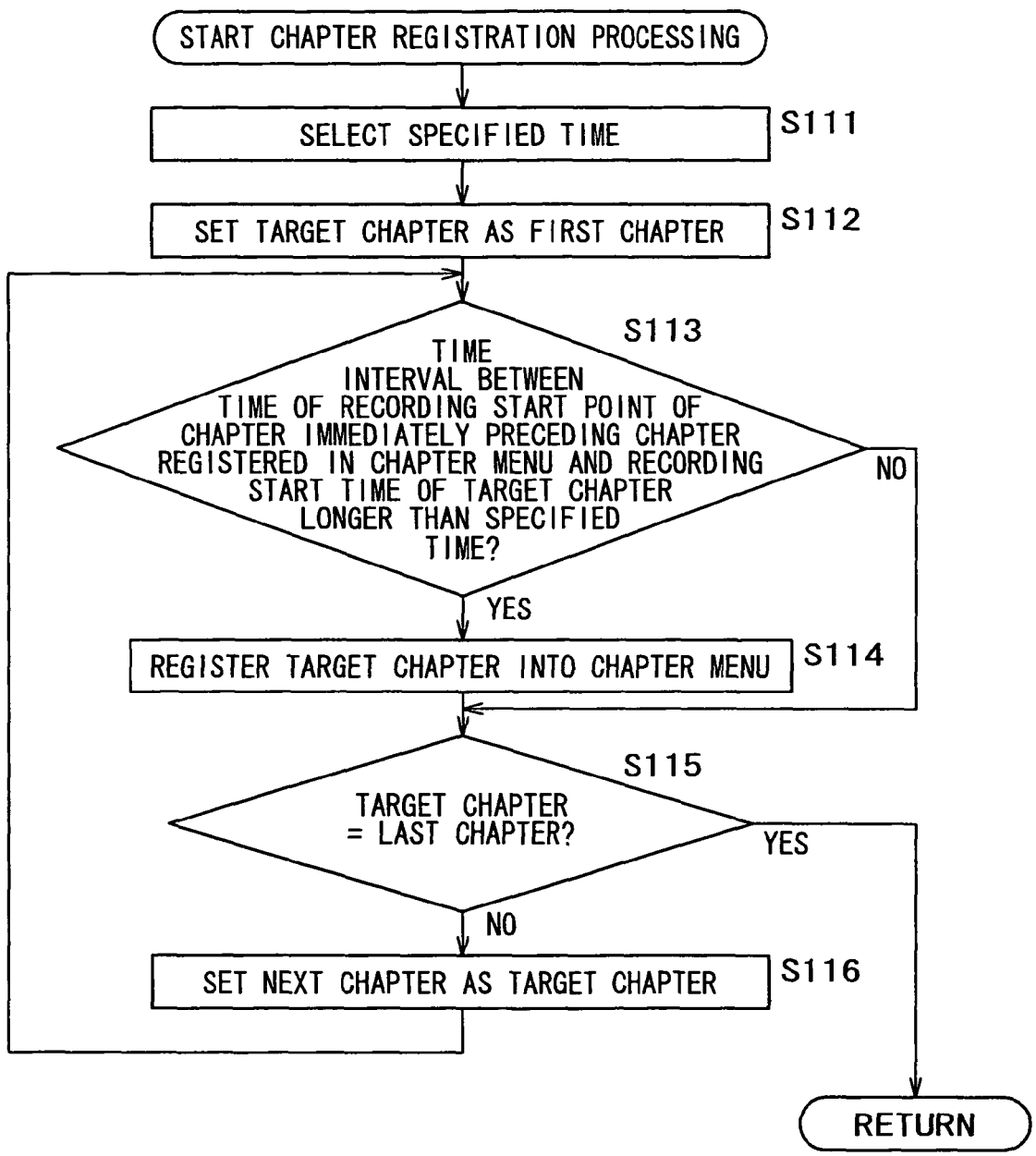
FIG. 19 is a flowchart indicative of exemplary details of chapter registration processing of the data acquisition/DVD write processing shown in FIG. 5.

The following describes the details of "chapter registration processing" of this example with reference to the flowchart shown in FIG. 19.

First, in step S111, the menu creation block 107 shown in FIG. 4 selects a specified time. For the specified time, a time set by the user is selected. The user can specify any desired time; in this example, the time is selected from 10 minutes, 30 minutes, and one day (24 hours) for example for the sake of description. The details of the specified time will be described later.

In step S112, the menu creation block 107 sets the target chapter to the first chapter (namely, the start chapter) of all chapters (namely, all chapters forming the recorded data of the digital video tape 13 acquired in step S9) included in the chapter list updated in step S9 (FIG. 5).

It should be noted that, in the description of "chapter registration processing", the chapter to be processed is referred to as a target chapter to make distinction from other chapters.

In step S113, the menu creation block 107 determines whether a time interval between the recording start time of the chapter registered immediately before in the chapter menu (namely, the video taking time information (year, month, day, hour, minute, and second) included in the start frame of the chapter registered in step S114 immediately before that point of time) and the recording start time of the target chapter (namely, the video taking time information (year, month, day, hour, minute, and second) included in the start frame of the target chapter) is longer than the specified time selected in step S111.

If the time interval between the recording start time of the immediately preceding chapter registered in the chapter menu and the recording start time of the target chapter is found longer than the specified time, then the menu creation block 107 registers the target chapter into the chapter menu in step S114. Namely, in this case, the target chapter becomes a chapter to be displayed in the chapter menu.

On the other hand, if the time interval between the recording start time of the immediately preceding chapter registered in the chapter menu and the recording start time of the target chapter is found shorter than the specified time (namely, not longer than the specified time), then the menu creation block 107 will not register the target chapter into the chapter menu (namely, does not execute the processing of step S114), advancing the processing to step S115.

In this case or if the processing of step S114 has ended, the menu creation block 107 determines whether or not the target chapter is the last chapter or not in step S115.

If the target chapter is found not the last chapter in step S115, then the menu creation block 107 sets a following chapter to the target chapter in step S116, upon which the processing is returned to step S113 to repeat itself therefrom.

Namely, decision is made for each of all chapters included in the chapter list updated in step S9 (FIG. 5) (namely, all chapters forming the recorded data of the digital video tape 13 acquired in step S9) whether or not the condition of step S113 is satisfied. Each of those chapters that satisfy the condition of step S113 is registered in the chapter menu (namely, registered as a chapter to be displayed in the chapter menu).

When the last chapter becomes a target chapter and it is determined whether or not to be registered in the chapter menu (namely, when the processing of step S113 and, as required, the processing of S114 are executed), then the target chapter is found to be the last chapter in step S115, upon which the processing returns.

Figure 20:
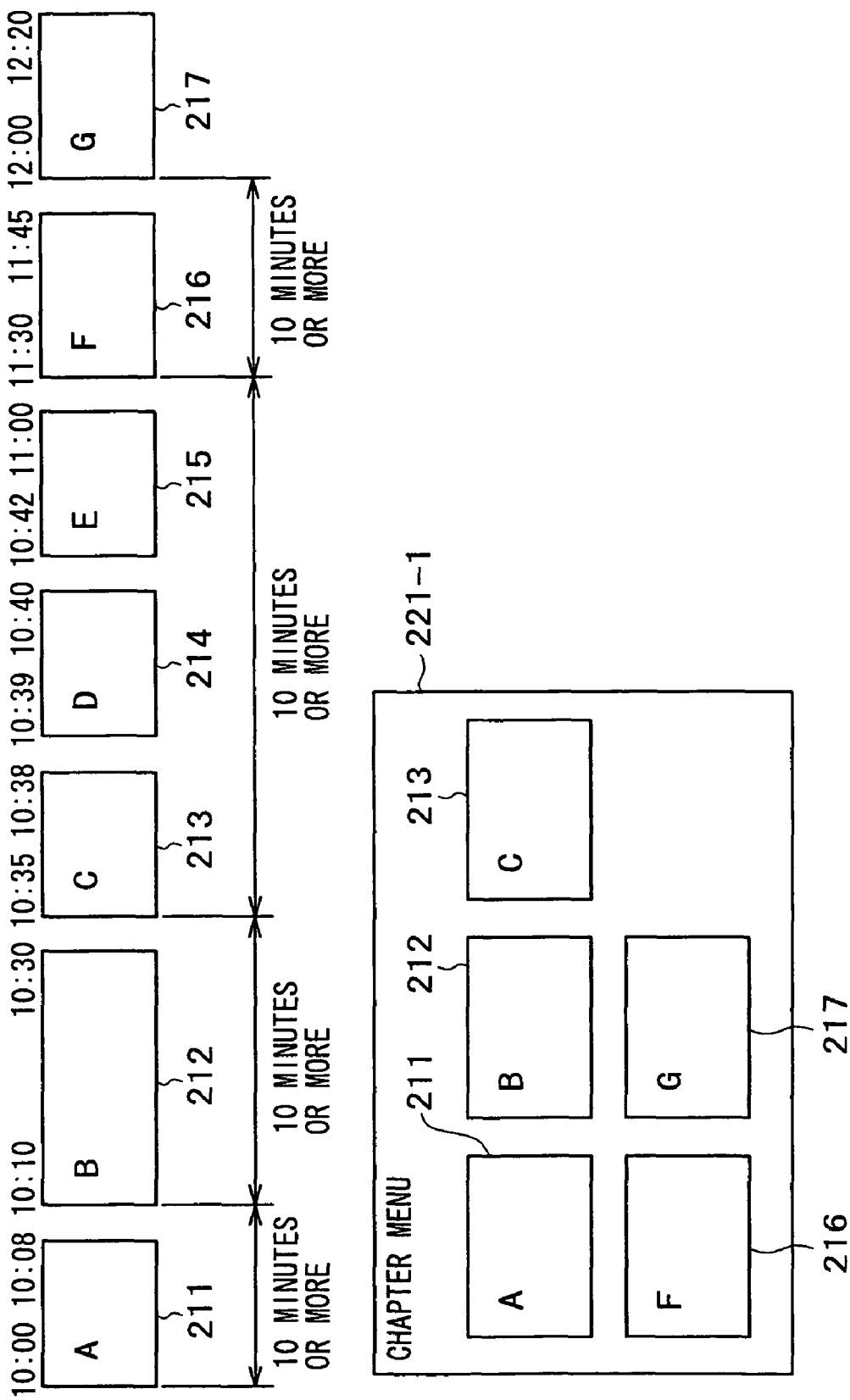
FIG. 20 is a diagram illustrating a specific example of the chapter registration processing shown in FIG. 19.
Figure 21:
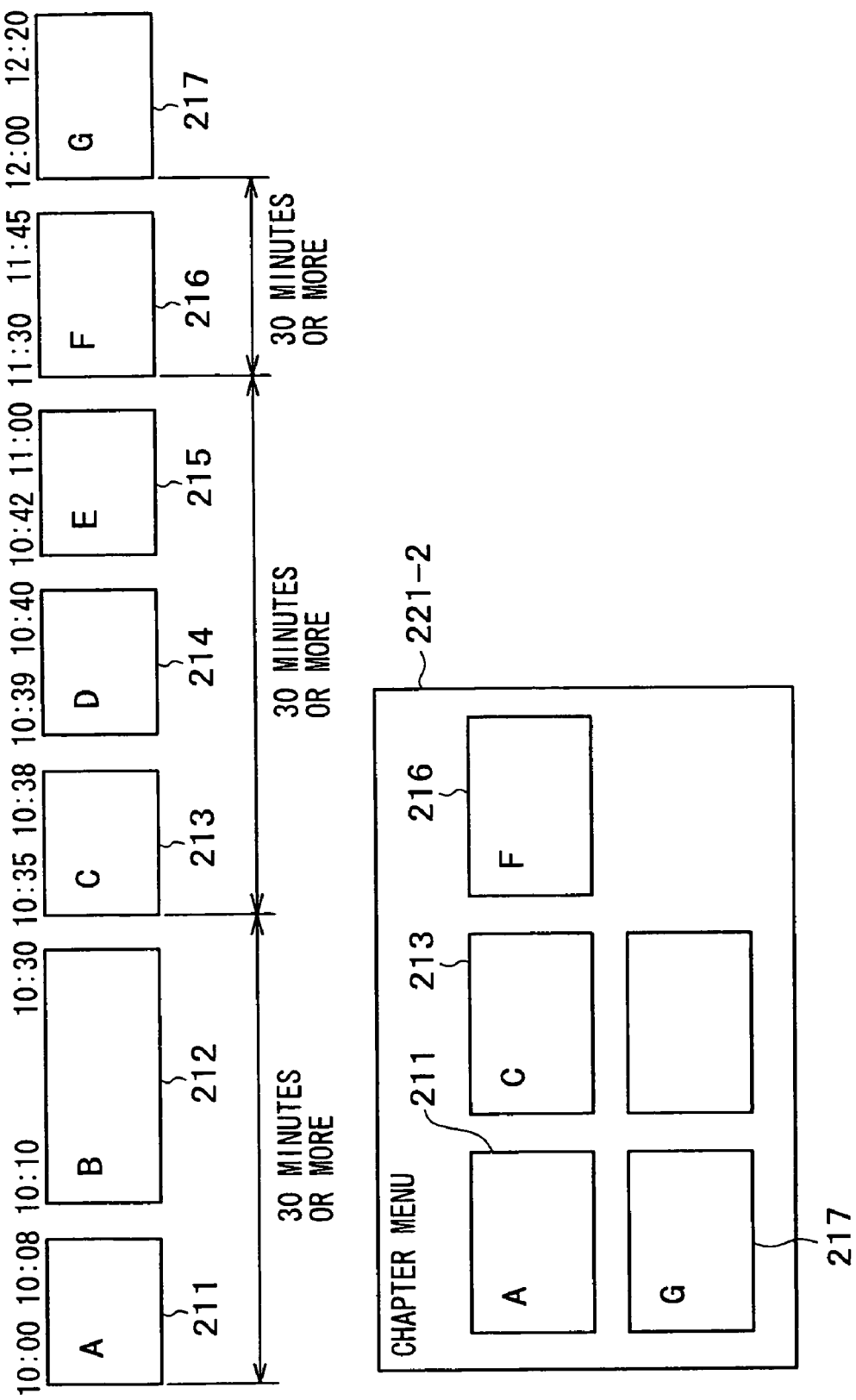
FIG. 21 is a diagram illustrating another specific example of the chapter registration processing shown in FIG. 19.
Figure 22:
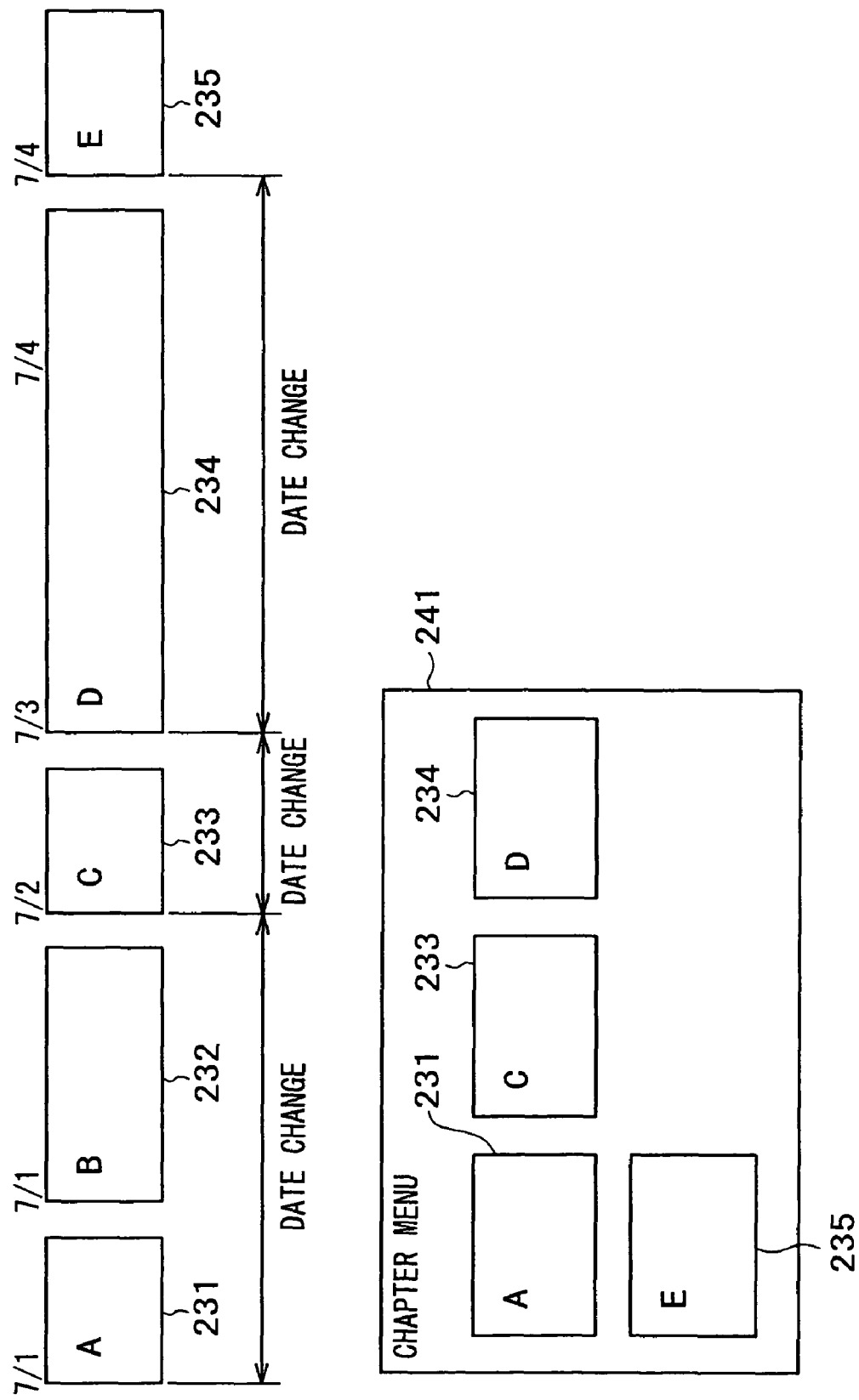
FIG. 22 is a diagram illustrating still another specific example of the chapter registration processing shown in FIG. 19.

The following describes specific examples of "chapter registration processing" with reference to FIGS. 20 through 22.

Namely, as described above, the specified time is variable and, in this example, selected from 10 minutes, 30 minutes, and one day (24 hours). FIG. 20 shows an example in which the specified time is 10 minutes, FIG. 21 shows an example in which the specified time is 30 minutes, and FIG. 22 shows an example in which the specified time is one day.

For example, it is supposed that video data is formed by chapters 211 through 217 in this order (namely, the chapters are reproduced in this order), as shown in FIG. 20. It should be noted that a value indicated in the upper left of each of the chapters 211 through 217 denotes a time at which the recording of that chapter starts (the time of the start chapter of that frame) and a value indicated in the upper right denotes a time at which the recording of that chapter ends (the time of the last chapter of that frame). For example, the time of the recording start point of the chapter 211 is 10:00 (10 o'clock) and the time of then recording end point is 10:08 (10 o'clock 8 minutes).

In this case, the chapter 211 is first set to the target chapter. Because, at that point time, no chapter listed in the chapter menu 221-1 is registered, the chapter 211 is registered in the chapter menu 221-1 in this case. Namely, the start chapter in the chapters forming video data is automatically registered in the chapter menu.

Next, when the chapter 212 next to the chapter 211 is set to the target chapter, the chapter 212 is registered in the chapter menu 221-1 because a time interval (10 minutes) between time 10:00 at which the recording of the chapter 211 registered immediately before into the DVD menu 221-1 and time 10:10 at which the recording of the target chapter 212 starts is longer than the specified time (10 minutes).

Then, the similar processing is repeated, registering the chapter 213 into the chapter list 221-1. At this time, when the chapter 214 subsequent to the chapter 213 is set to the target chapter, the chapter 214 is not registered in the chapter menu 221-1 because a time interval (4 minutes) between time 10:35 at which the recording of the chapter 213 registered immediately before into the DVD menu 221-1 starts and time 10:39 at which the recording of the target chapter 214 starts is shorter than the specified time (10 minutes). Next, the chapter 215 is set to the target chapter.

Subsequently, the above-mentioned processing continues up to the last chapter 217, eventually generating the chapter menu 221-1 as shown in FIG. 20.

Namely, the chapter 215 is not registered in the chapter menu 221-1 because a time interval (7 minutes) between time 10:35 at which the recording of the chapter 213 registered immediately before into the DVD menu 221-1 starts and time 10:42 at which the recording of the chapter 215 starts is shorter than the specified time (10 minutes).

On the other hand, the chapter 216 is registered in the chapter menu 221-1 because a time interval (55 minutes) between time 10:35 at the recording of the 213 registered immediately before in the DVD menu 221-1 starts and time 11:30 at which the recording of the chapter 216 starts is longer than the specified time (10 minutes).

Likewise, the chapter 217 is registered in the chapter menu 221-1 because a time interval (30 minutes) between time 11:30 at which the recording of the chapter 216 registered immediately before into the DVD menu 221-1 starts and time 12:00 at which the recording of the chapter 216 starts is longer than the specified time (10 minutes).

As described above, the specified time is variable and therefore can be set to any time in step S111 (FIG. 19). For example, in FIG. 20, the specified time is 10 minutes; if the specified time is set to 30 minutes, then the chapter menu 221-2 as shown in FIG. 21 is generated from the same video data as shown in FIG. 20 (namely, the video data formed by chapters 211 through 217).

Comparing the chapter menu 221-1 shown in FIG. 20 with the chapter menu 221-2 shown in FIG. 21 indicates that the chapter menu 212 registered in the chapter menu 221-1 shown in FIG. 20 is not registered in the chapter menu 221-2. This is because the time interval between time 10:00 at which the recording of the chapter 211 registered in the DVD menu 221-1 immediately before starts and time 10:10 at which the recording of the target chapter 212 starts is 10 minutes and, if the specified time is 10 minutes as shown in FIG. 20, the condition of step S113 (FIG. 11) is satisfied, but, if the specified time is 30 minutes as shown in FIG. 21, the condition of step S113 is not satisfied.

Further, the specified time can also be set in units of one day, one week, one month, or one year (namely, in different units from units of second, minute, or hour), in addition to any desired time described above.

It should be noted that, if the specified time is set in any of these units, the division in unit is the boundary between dates. This boundary may be fixed simply to 0:00 midnight. However, along with the change in life style, some events frequently extend over 0:00 midnight and continue until the next day. In that case, if the unit division is simply set at 0:00, such event is divided inappropriate section, so that a problem of the discontinuation of an event takes place. Therefore, in this example, the boundary between dates can be set to any point of time. Namely, not only the date boundary set by the designer beforehand but also that set by the user as desired can be used.

When the specified time is set in units of date (one day), the start chapter (for example, a start chapter 231 of the two chapters of 7/1, chapter 231 and chapter 232) of the chapters of the same day is registered in a chapter menu 241. Namely, the start chapter 231 of 7/1, a start chapter 233 of 7/2, a start chapter 234 of 7/3, and a start chapter 235 of 7/4 are registered in the chapter menu 241.

It should be noted that, in this example, as shown with the chapter 234, if the end time of the chapter that is a continuous recording (namely, a continuous recording between the recording start time and the recording end time) is beyond the above-mentioned boundary of date, that chapter is not divided over the date boundary and therefore the data subsequent to the date boundary is not handled as the start chapter of the next day, so that such chapter is handled as one whole chapter. Namely, the next chapter (in this case, the chapter 235) is handled as the start chapter of the next day and registered in the chapter menu.

As described above, the menu creation block 107 (FIG. 4) can executes "chapter menu registration processing", thereby attaining the following advantages.

Conventionally, it is also practicable for the user to create the chapter menu of the DVD menus by use of the PC when recording the video data (namely, the data recorded to the digital video tape 13) taken by the DV 12 to a DVD.

However, in related-art techniques, the PC registers the chapters manually specified by the user into the chapter menu or all chapters forming the captured video data into the chapter menu. This related-art configuration presents problems of increasing the time for creating the chapter menu and the registration of unnecessary chapters into the DVD menu.

For example, if the recording section between the recording start point and the recording end point provides a chapter as with the present embodiment, one piece of video data (namely, the video data to be recorded to the DVD 14) is formed by vast many chapters; therefore, if these chapters are all registered in the chapter menu, problems occurs that it takes long to create the chapter menu and it is difficult for the user to search the chapter menu for desired chapters.

A method is also known in which continuous video data is simply divided by a predetermined time interval to create a chapter. With this method, however, the chapters registered in the chapter menu are not always created for each event, so that it is difficult to automatically create a chapter menu desired by the user.

In contrast, the PC 11 (FIGS. 1 and 2) according to the invention provides "chapter registration processing" as one of the functions of the data acquisition/DVD write block 91 (FIG. 4). Namely, this function allows the automatic creation of a chapter menu on the basis of recording start information (namely, a recording start point) without requiring special operations by the user (namely, the user may only connect the DV 12 to the PC 11 and turn on the power to the DV 12), thereby freeing the user from complicated operations and automatically creating a chapter menu.

In other words, the PC 11 is an information processing apparatus for creating, if predetermined content data is divided into a plurality of sections, a table contents indicative of a recording sequence of the sections of content data with a predetermined section among the plurality of sections used as an item, the information processing apparatus comprising table-of-contents creation means for sequentially setting each of the plurality of sections to a target section in the order of recording of the plurality of sections and, if a time interval between a recording start time of a section registered immediately before as an item of the table of contents and a recording start time of the target section set this time is greater than a predetermined specified time, repeating processing of registering target sections as items of the table of contents, thereby creating the table of contents.

Thus, a chapter menu is created on the basis of the video taking start time between chapters, so that the chapter menu can be created for each of internals of predetermined video taking events. Especially, if each of the games constituting an athletic festival for example provides one video taking event, if each of the primary and secondary parties of a wedding ceremony for example provides one video taking event, or if each of the first and second halves of a succor game provides one video taking event, the advantage of this "chapter registration processing" in this example is conspicuous.

Consequently, by executing "chapter menu registration processing", the menu creation block 107 can solve the above-mentioned problems involved in the chapter menu creation based on related-art techniques.

The present invention has been described by use of the information processing system 1 shown in FIG. 1 as one example; however, various other embodiments are practicable.

For example, the method of the connection between the PC 11 and the DV 12 is not limited to the method described herein as long as the above-mentioned sequence of processing operations can be supported.

Figure 23:
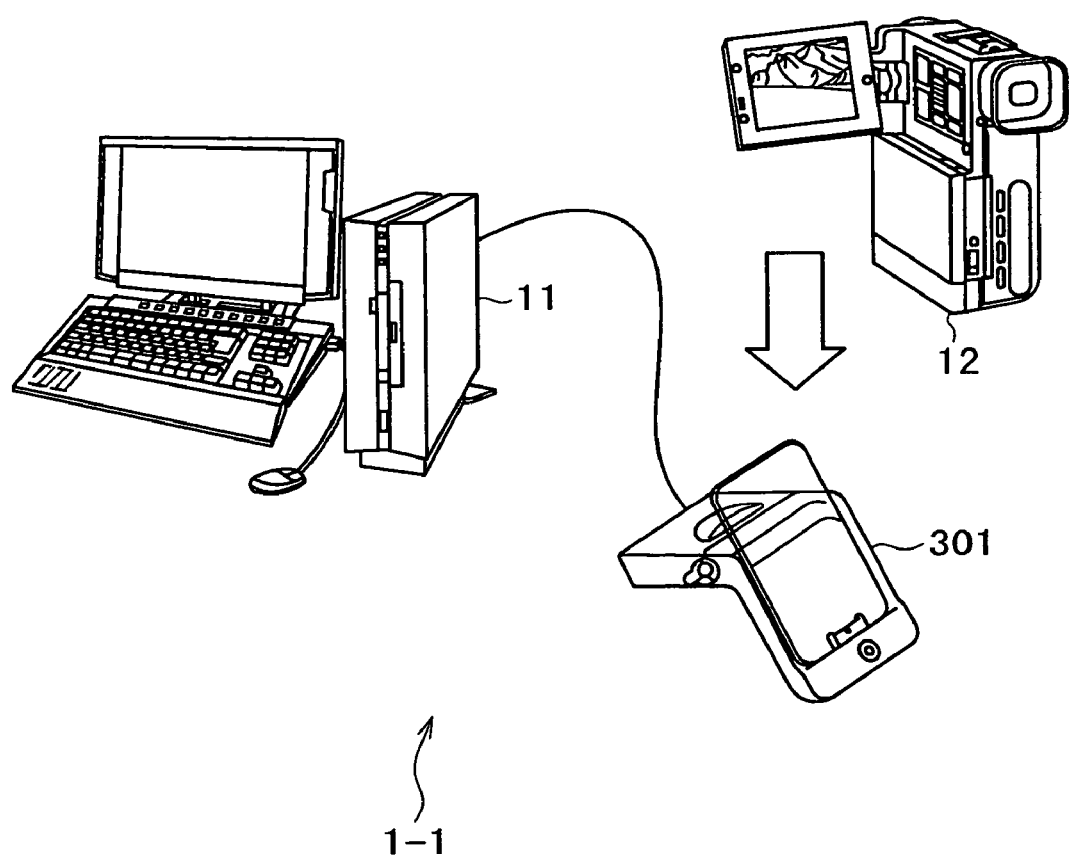
FIG. 23 is a block diagram illustrating another exemplary configuration of the information processing apparatus including a personal computer to which the present invention is applied.

To be more specific, as shown in FIG. 23 for example, a cradle 301 may be connected to the PC 11; the DV 12 is mounted on this cradle 301 to be connected to the PC 11 through the cradle 301. Namely, in this case, cradle 301 is used in place of the cable 15 (FIG. 1); when the DV 12 is mounted on the cradle 301, the i.LINK 45 (FIG. 2) of the PC 11 and the i.LINK 78 (FIG. 3) of the DV 12 are interconnected.

Figure 24:
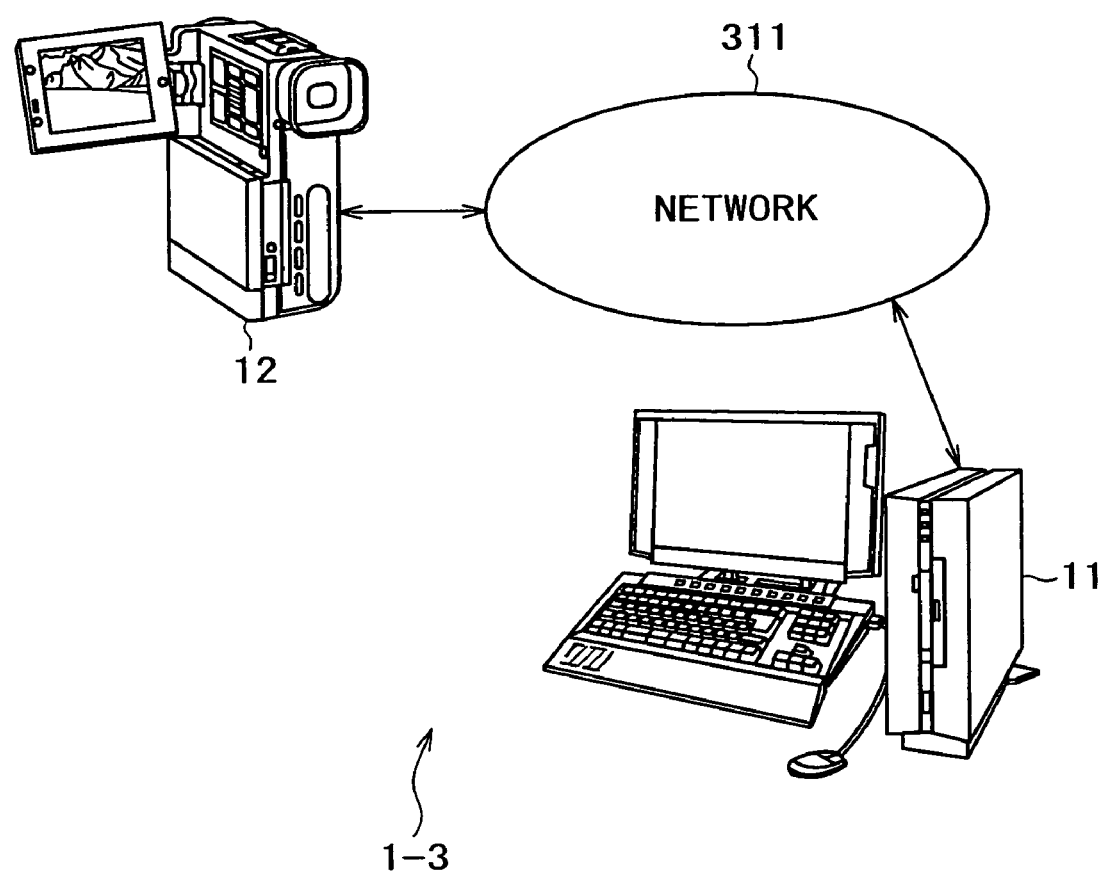
FIG. 24 is a block diagram illustrating still another exemplary configuration of the information processing apparatus including a personal computer to which the present invention is applied.

Alternatively, as shown in FIG. 24, the PC 11 and the DV 12 may be interconnected via a network 311 including the Internet.

Figure 25:
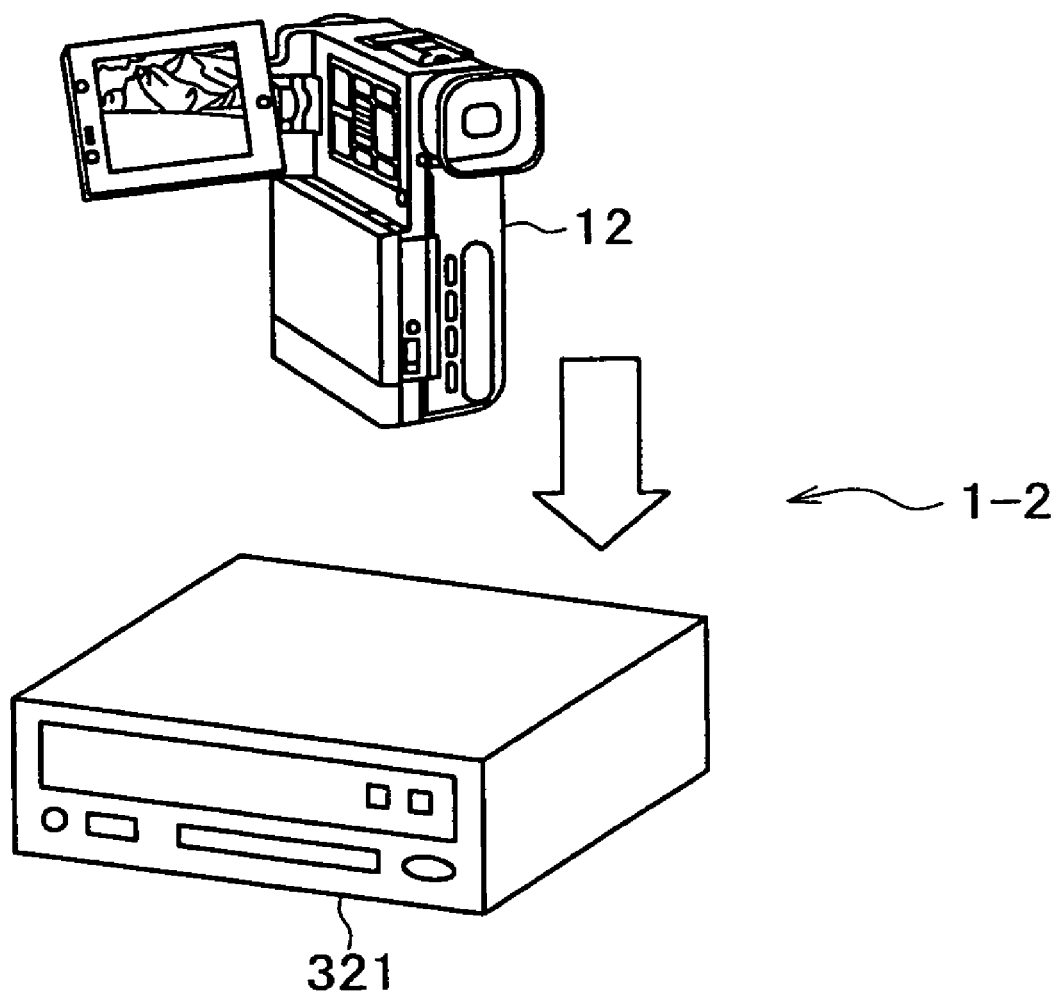
FIG. 25 is a block diagram illustrating yet another exemplary configuration of the information processing apparatus including a personal computer to which the present invention is applied.

The information processing apparatus to which the present invention is applied is not limited to the PC; for example, the information processing apparatus may be embodied as an optical drive device 321 as shown in FIG. 25.

The optical drive device 321 may only have a configuration that basically has substantially the same function as the DVD-R/RW drive 36 shown in FIG. 2. It should be noted however that, in this case, the optical drive device 321 must have a software program for executing the above-mentioned sequence of processing operations (namely, the data acquisition/DVD write block 91 (FIG. 4)), a memory for storing the recorded data of the digital video tape 13 supplied from the DV 12 (for example, a hard disk drive like the HDD 34 shown in FIG. 2), a CPU for executing this program (for example, a CPU like the CPU 21 shown in FIG. 2), a memory for temporarily storing parameters and data necessary for executing this program (for example, a RAM), and the i.LINK for transmitting and receiving data with the DV 12.

Alternatively, the software program for executing the above-mentioned sequence of processing operations (namely, the data acquisition/DVD write block 91 (FIG. 4)) may be installed on the DV 12 itself.

When the above-mentioned sequence of processing operations is executed by software, the programs constituting the software are installed in a computer which is built in dedicated hardware equipment or installed, from a recording media, into a general-purpose personal computer for example in which various programs may be installed for the execution of various functions.

As shown in FIG. 2, the recording medium is constituted by not only the removable recording medium 49 (a package media) made up of the magnetic disk (including flexible disks), the optical disk (including CD-ROM (Compact Disk Read Only Memory) and DVD (Digital Versatile Disk)), the magneto-optical disk (including MD (Mini-Disc) (trademark)), or the semiconductor memory which is distributed separately from the personal computer itself, but also the ROM or a hard disk drive including the HDD 34 which stores programs and is provided to users as incorporated in the personal computer itself.

The above-mentioned sequence of processing operations may be executed by software as well as hardware. In the hardware approach, the information processing apparatus has the hardware corresponding to the data acquisition/DVD write block 91 as shown in FIG. 4 for example.

It should be noted herein that the steps for describing each program recorded in recording media include not only the processing operations which are sequentially executed in a time-dependent manner but also the processing operations which are executed concurrently or discretely.

In the above-mentioned examples, the description is made by use of the format of the DV 12 for example and therefore term "frame" is used; it is also practicable to use term "field" instead. Herein, these terms "frame" and "field" are also referred to as access units.

It should also be noted that term "system" as used herein denotes an entire apparatus configured by a plurality of component units.

INDUSTRIAL APPLICABILITY

As described and according to the invention, the data recorded to a digital video tape can be recorded to a DVD. Especially, only connecting a DV loaded with a digital video tape to a PC and turning on the power to the DV by the user (and, as required, once clicking the PC's mouse button for directing the execution of processing) can execute a sequence of processing operations of capturing the data recorded to the digital video tape from the DV into the PC, converting DV format to DVD format, and recording the converted data to a DVD. In other words, a sequence of processing operations of recording video data recorded to a first recording medium in a first format to a second recording medium in a second format without user's manual intervention.

The invention claimed is:

1. An information processing apparatus comprising:
   checking means for checking predetermined time information of content data recorded in a first format by controlling a content providing device to reproduce at a faster speed than a normal speed of the content providing device;
   setting means for setting, on the basis of said content data time information checked by said checking means, bit rates with which said content data is recorded from said information processing apparatus to a predetermined removable recording medium, the setting means selecting the bit rates such that an amount of data to be stored on the predetermined removable recording medium is less than a capacity of a predetermined removable recording medium based on a comparison between a resulting amount of data for selected bit rates and the capacity of a predetermined removable recording medium, said content data including moving image data and audio data corresponding thereto, and said setting means reduces the audio data bit rate from an original audio data bit rate to a reduced audio data bit rate without reducing the moving image bit rate if a resulting original amount of data for original audio and moving image bit rates exceeds the capacity of the predetermined removable recording medium; and recording control means for converting the format of said content data from said first format to a second format and recording the converted content data to said recording medium with said bit rates set by said setting means.

2. The information processing apparatus according to claim 1, wherein said checking means checks a recording time of said content data recorded in said first format as said time information.

3. The information processing apparatus according to claim 2, wherein said setting means sets, as said bit rates, a first bit rate corresponding to said moving image data and a second bit rate corresponding to said audio data; and said recording control means executes control so as to record said moving image data of said content data in said first bit rate set by said setting means and record said audio data in said second bit rate set by said setting means.

4. The information processing apparatus according to claim 3, wherein a first fixed value is predetermined as a maximum value among settable values of said first bit rate; a second fixed value is predetermined as a maximum value among settable values of said second bit rate; and said setting means, if a first inequality expressed in $(B1+B2) \times Tx < Cmax$ where Tx denotes a recording time of said content data checked by said checking means, B1 denotes said first fixed value, B2 denotes said second fixed value, and Cmax denotes a recordable maximum capacity of said recording medium of which recording is controlled by said recording control means, is found established, then sets said first fixed value as a value of said first bit rate and said second fixed value as a value of said second bit rate.

5. The information processing apparatus according to claim 4, wherein a third fixed value lower than said second fixed value is predetermined as a settable value of said second bit rate; and said setting means, if said first inequality is found not established and a second inequality expressed in $(B1+B3) \times Tx < Cmax$ where B3 denotes said third fixed value is found established, then sets said first fixed value as a value of said first bit rate and said third fixed value as a value of said second bit rate.

6. The information processing apparatus according to claim 5, wherein said setting means, if said first inequality is found not established and said second inequality is found not established, then computes a fourth value denoted by B4 in a third inequality for establishing said third inequality $(B4+B3) \times Tx < Cmax$, sets the computed fourth value as a value of said first bit rate and said third fixed value as a value of said second bit rate.

7. The information processing apparatus according to claim 6, wherein said setting means computes said fourth value on the basis of the establishment of said third inequality and a predetermined characteristic that, as a recording time of said content data checked by said checking means increases, the value of said first bit rate linearly decreases.

8. The information processing apparatus according to claim 1, wherein said first format is a format of a digital video tape recorder and said second format is a format specified by the DVD standard.

9. The information processing apparatus according to claim 1, further comprising:

storage means for storing said content data, said recording control means including:

computation means for computing a free capacity of said storage means;

acquisition means for dividing said content data into a plurality of data sections on the basis of said free capacity of said storage means computed by said computation means, acquiring a predetermined first data section among said plurality of data sections, and storing said acquired predetermined first data section into said storage means;

conversion means for converting said format of said first data section acquired by said acquisition means from said first format to a second format, generating a second data section smaller in data amount than said first data section, and storing the generated second data section into said storage means;

deletion means for deleting, when said generated second data section obtained by converting said format of said first data section by said conversion means has been stored in said storage means, said first data section from said storage means before a third data section different from said first data section is acquired by said acquisition means from among said plurality of data sections forming said content data; and recording medium recording control means for, if said content data has all been acquired in said acquisition means, converted into said second format in said conversion means, and stored in said storage device, recording the content data of said second format to said recording medium at said bit rate set by said setting means.

10. The information processing apparatus according to claim 9, wherein said computation means computes a first data amount of said content data in said first format and a second data amount of said content data in said second format and adds the computed first data amount and the computed second data amount together to compute a first threshold value; and said acquisition means, if said free capacity of said storage means computed by said computation means is smaller than said first threshold value computed by said computation means, sets, as a second threshold value, an amount obtained by subtracting said second data amount computed by said computation means from said free capacity of said storage means, divides said content data into said plurality of data sections having a data amount smaller than said second threshold value, and acquires said first data section among said plurality of data sections, and stores the acquired first data section into said storage means.

11. The information processing apparatus according to claim 10, wherein said first format is a format of a digital video tape recorder; said acquisition means acquires said content data by making said digital video tape recorder reproduce a digital video tape on which said content data is recorded; and said second format is a format specified by the DVD standard.

12. The information processing apparatus according to claim 11, wherein said recording control means further has section checking means makes said digital video tape recorder reproduce said digital video tape recorded with said content data to check a recording section that appears after said recording start point and before said recording end point; and said acquisition means divides said content data by use of data corresponding to each of said plurality of recording sections checked by said section checking means, as one of said section data, and acquires said first section data of the plurality of divided section data, thereby storing the acquired first section data into said storage means.

13. The information processing apparatus according to claim 12, wherein said acquisition means, if there is any data among data corresponding to said plurality of recording sections checked by said section checking means that exceeds said second threshold value in data amount, does not handle said data corresponding to said recording section exceeding said second threshold value in data amount as one of said section data, but further divides said data into a plurality of data lower in data amount than said second threshold value, divides said content data with each of said plurality of data lower in data amount than said second threshold value used as one section data, acquires said first section data among said plurality of section data, and stores said first section data into said storage means.

14. The information processing apparatus according to claim 12, wherein said section checking means makes said digital video tape recorder reproduce said digital video tape recorded with said content data at a speed higher than normal to check an interim recording section corresponding to said recording section; and said acquisition means divides said content data with data corresponding to said plurality of interim recording sections checked by said section checking means used as one interim section data, detects a recording start point of said recording section corresponding to a predetermined first section data among said plurality of interim section data, controls said digital video tape recorder to reproduce data corresponding to said recording section from the detected recording start point up to said recording end point that appears next to said recording start point, acquires, as said first section data, said data corresponding to said recording section of which reproduction by said digital video tape recorder is controlled, and stores said data thus acquired into said storage means.

15. A non-transitory computer readable medium including computer executable instructions, wherein the instructions, when executed by a processor, cause the processor to perform a method comprising:
checking predetermined time information of content data recorded in a first format by controlling a content providing device to reproduce at a faster speed than a normal speed of the content providing device;
setting, on the basis of said content data time information checked by said checking, bit rates with which said content data is recorded from said information processing apparatus to a predetermined removable recording medium, the setting including selecting the bit rates such that an amount of data to be stored on the predetermined removable recording medium is less than a capacity of a predetermined removable recording medium based on a comparison between a resulting amount of data for selected bit rates and the capacity of a predetermined removable recording medium, said content data including moving image data and audio data corresponding thereto, and said setting includes reducing the audio data bit rate from an original audio data bit rate to a reduced audio data bit rate without reducing the moving image bit rate if a resulting original amount of data for original audio and moving image bit rates exceeds the capacity of the predetermined removable recording medium; and
converting the format of said content data from said first format to a second format and recording the converted content data to said recording medium with said bit rates set by said setting.

16. The computer readable medium according to claim 15, wherein said converting includes,
computing a free capacity of a predetermined storage device;
dividing said content data into a plurality of data sections on the basis of said free capacity of said storage device computed by said computing, acquiring a predetermined first data section among said plurality of data sections, and storing said acquired predetermined first data section into said storage device;
converting said format of said first data section acquired by said dividing from said first format to a second format, generating a second data section smaller in data amount than said first data section, and storing the generated second data section into said storage device;
deleting, when said generated second data section obtained by converting said format of said first data section by said converting said format of said first data section has been stored in said storage device, said first data section from said storage device before a third data section different from said first data section is acquired by said dividing from among said plurality of data sections forming said content data; and
recording the content data of said second format to said recording medium at said bit rate set by said setting if said content data has all been acquired in said dividing, converted into said second format in said converting said format of said first data section, and stored in said storage device.

17. An information processing apparatus comprising:
a checking unit configured to check predetermined time information of content data recorded in a first format by controlling a content providing device to reproduce at a faster speed than a normal speed of the content providing device;
a setting unit configured to set bit rates with which said content data is recorded from said information processing apparatus to a predetermined removable recording medium on the basis of said content data time information checked by said checking unit, the setting unit configured to select the bit rates such that an amount of data to be stored on the predetermined removable recording medium is less than a capacity of a predetermined removable recording medium based on a comparison between a resulting amount of data for selected bit rates and the capacity of a predetermined removable recording medium, said content data including moving image data and audio data corresponding thereto, and said setting unit is configured to reduce the audio data bit rate from an original audio data bit rate to a reduced audio data bit rate without reducing the moving image bit rate if a resulting original amount of data for original audio and moving image bit rates exceeds the capacity of the predetermined removable recording medium; and
a recording controller configured to convert the format of said content data from said first format to a second format and recording the converted content data to said recording medium with said bit rates set by said setting unit.

18. The information processing apparatus according to claim 17, wherein said checking unit is configured to check a recording time of said content data recorded in said first format as said time information.

19. The information processing apparatus according to claim 18, wherein said setting unit is configured to set, as said bit rates, a first bit rate corresponding to said moving image data and a second bit rate corresponding to said audio data; and said recording controller is configured to execute control so as to record said moving image data of said content data in said first bit rate set by said setting unit and record said audio data in said second bit rate set by said setting unit.

20. The information processing apparatus according to claim 19, wherein a first fixed value is predetermined as a maximum value among settable values of said first bit rate; a second fixed value is predetermined as a maximum value among settable values of said second bit rate; and said setting unit, if a first inequality expressed in (B1+B2)×Tx<Cmax where Tx denotes a recording time of said content data checked by said checking unit, B1 denotes said first fixed value, B2 denotes said second fixed value, and Cmax denotes a recordable maximum capacity of said recording medium of which recording is controlled by said recording controller, is found established, then sets said first fixed value as a value of said first bit rate and said second fixed value as a value of said second bit rate.

21. The information processing apparatus according to claim 17, wherein the setting unit selects a value for the bit rate of audio data and selects a value for the bit rate of video data by computing a maximum possible bit rate based on the capacity of the predetermined removable storage medium and the value for the bit rate of the audio data.

22. The information processing apparatus according to claim 1, wherein the setting means selects a value for the bit rate of audio data and selects a value for the bit rate of video data by computing a maximum possible bit rate based on the capacity of the predetermined removable storage medium and the value for the bit rate of the audio data.

23. The computer readable medium according to claim 15, wherein the setting includes a selecting a value for the bit rate of audio data and selecting a value for the bit rate of video data by computing a maximum possible bit rate based on the capacity of the predetermined removable storage medium and the value for the bit rate of the audio data.

* * * * *